United States Patent
Tomasi

(10) Patent No.: US 11,670,128 B2
(45) Date of Patent: Jun. 6, 2023

(54) DISPENSER SYSTEM

(71) Applicant: TAINR, Los Angeles, CA (US)

(72) Inventor: Philip Tomasi, Newbury Park, CA (US)

(73) Assignee: TAINR, Los Angeles, CA (US)

( * ) Notice: Subject to any disclaimer, the term of this patent is extended or adjusted under 35 U.S.C. 154(b) by 0 days.

(21) Appl. No.: 17/858,061

(22) Filed: Jul. 5, 2022

(65) Prior Publication Data

US 2023/0009534 A1   Jan. 12, 2023

Related U.S. Application Data

(60) Provisional application No. 63/218,529, filed on Jul. 6, 2021.

(51) Int. Cl.
*G07F 9/00* (2006.01)
*G07F 9/02* (2006.01)
*G07F 17/00* (2006.01)

(52) U.S. Cl.
CPC ............ *G07F 9/0235* (2020.05); *G07F 9/002* (2020.05); *G07F 17/0064* (2013.01)

(58) Field of Classification Search
CPC ..... G07F 9/0235; G07F 9/002; G07F 17/0064
See application file for complete search history.

(56) References Cited

U.S. PATENT DOCUMENTS

| | | | | |
|---|---|---|---|---|
| 5,937,920 A * | 8/1999 | Simmel | ...................... | B65B 1/06 141/354 |
| 6,725,889 B2 * | 4/2004 | Perez Vales | .......... | G07F 13/025 141/286 |
| 8,523,014 B2 * | 9/2013 | Sollazzo | .............. | G01G 13/026 222/77 |
| 9,440,842 B1 | 9/2016 | Pino | | |
| 9,581,240 B2 * | 2/2017 | Yamashita | ............ | F16H 61/688 |
| 10,364,056 B2 * | 7/2019 | Schwarzli | ............. | B65B 61/025 |
| 10,702,839 B2 * | 7/2020 | Sollazzo Lee | ........ | A47J 43/044 |
| 2011/0138751 A1 * | 6/2011 | Nakagawa | .............. | B65B 43/50 53/469 |
| 2012/0065774 A1 * | 3/2012 | Peretz | ..................... | G07F 11/54 700/232 |
| 2014/0288699 A1 * | 9/2014 | Williams | ................ | B29C 64/25 700/233 |

(Continued)

FOREIGN PATENT DOCUMENTS

WO       2018118659 A1     6/2018

OTHER PUBLICATIONS https://www.miwa.eu.

(Continued)

*Primary Examiner* — Michael Collins
(74) *Attorney, Agent, or Firm* — Mackey Law Firm PLLC

(57) ABSTRACT

A system for dispensing one or more products can include one or more product containers, each with a port for dispensing a product, a housing with one or more container cavities for removably receiving the product containers, one or more quantity sensors for detecting a quantity of product within one or more product containers, one or more actuators for dispensing product from one or more product containers, and a controller configured to monitor or control one or more aspects of the system.

20 Claims, 15 Drawing Sheets

(56) References Cited

U.S. PATENT DOCUMENTS

| | | | | |
|---|---|---|---|---|
| 2014/0303774 | A1* | 10/2014 | Schwarzli | G07F 9/02 700/233 |
| 2015/0375984 | A1 | 12/2015 | Arcand et al. | |
| 2016/0018250 | A1* | 1/2016 | Sollazzo Lee | G01G 13/02 222/77 |
| 2020/0090114 | A1 | 3/2020 | Conway | |
| 2020/0405075 | A1 | 12/2020 | Mackay et al. | |

OTHER PUBLICATIONS

MIWA Easy Shopping Experience.
https://www.miwa.eu/miwa-in-action.
MIWA in Action.
MIWA Blog.
MIWA Values.
MIWA How it works—Reusable Capsule.
MIWA How it works—Modular Shelf.
MIWA How it works—MIWA Cup.
MIWA How it works—Shopper App.
MIWA How it Works—Information Systems.
https://www.youtube.com/watch?v=xPCZPXkgKbs.
https://www.purcell.eco.
https://www.purcell.eco/s1-dispenser.
Purcell Simplified Solutions.
Purcell S1-Dispenser.
https://www.youtube.com/watch?v=65pUnrllDP8.
https://www.youtube.com/watch?v=vk2pG06YKYA.
Purcell Simplified Refill Solutions.
Purcell Smart Bins.
https://vimeo.com/568639460?embedded=true&source=vimeo_logo&owner=124092434.
Ecopod—More Refills Less Plastic.
Alagramo, Home, Technology Led Innovation.
Alagramo 2—Technology Led Innovation.
https://algramo.com/en/.
https://ecopod.us.
https://www.youtube.com/watch?v=90ZkJLNvS4s.
Ecopod—How it works—Refill Solutions.
MIWA-YT—MIWA20220726—MIWA in Action.
Miwa—YT—Shopping Experience.
Nestle—YT—Reducing Single Use Packaging.
Purcell—YT—SmartBins—Add on Product.
PCT Application No. PCT/US2022/036269 International Search Report dated Sep. 30, 2022.

* cited by examiner

DISPENSER SYSTEM

CROSS REFERENCE TO RELATED APPLICATIONS

This application claims the benefit of U.S. Provisional Patent Application No. 63/218,529 filed Jul. 6, 2021, the entire contents of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to dispensing systems and more specifically relates to systems and methods for dispensing goods, such as dry unpackaged foods.

Description of the Related Art

Dispensing of product is often complicated by spillage, shrinkage, contamination, inventory management, quantification, identification, and sales. Single-use packaging adds costs to the product and burdens the environment.

Current distribution of product is often thru bins and scoops, pumps, or manual dispensers. Manual dispensers often underutilize space and may not properly seal. Bins and manual dispensing are usually accompanied by a separate scale for weighing and labels for product identification, both of which are subject to intentional and/or unintentional error. Inventory monitoring can be very manual and inaccurate. Personal contact with both the equipment and often the product itself allows for contamination and shrinkage.

BRIEF SUMMARY OF THE INVENTION

Applicants have created new and useful devices, systems and methods for dispensing goods.

In at least one embodiment, a system for dispensing products can include first and second product containers, each having a sealing dispenser port for containing a product therein; a housing having first and second product container cavities to selectively receive either the first of the second product container; a controller configured to identify which product is in which product container cavity and open the sealing dispenser ports to selectively dispense a specified quantity of the first product and a specified quantity of the second product. In at least one embodiment, the controller can be mounted within the housing.

In at least one embodiment, one or more of the product containers can include an identification tag and the housing can include an identification sensor associated with each product container cavity. In at least one embodiment, the controller can identify which product container is in which cavity using the identification tags and the identification sensors.

In at least one embodiment, one or more of the dispenser ports can selectively seal the respective product container and/or dispense the product from the respective product container. In at least one embodiment, the controller can be configured to selectively open the sealing dispenser ports to selectively dispense specified quantities of each of the products. For example, the housing can include one or more sealing dispenser port actuators for selectively dispensing from the product container cavities. In at least one embodiment, the controller can selectively trigger the port actuators to open the sealing dispenser ports to selectively dispense specified quantities of each of the products.

In at least one embodiment, the housing can include one or more quantity sensors associated with the product container cavities, with each quantity sensor detecting a product quantity within the respective product container cavity. In at least one embodiment, the controller can be configured to selectively open the sealing dispenser ports to selectively dispense specified quantities of each of the products based at least in part on the quantity sensors.

In at least one embodiment, one or more of the product containers can include a product driver configured to selectively shift the product in the product container toward the dispenser port. In at least one embodiment, the housing can include one or more product driver actuators, each associated with one of the product container cavities. In at least one embodiment, the controller is further configured to monitor the quantity sensors and energize the product driver actuators based at least in part on the quantity sensors.

In at least one embodiment, the housing can include a touchscreen display providing a user interface. In at least one embodiment, the touchscreen can be operatively coupled to the controller. In at least one embodiment, the controller can include a wireless communications module configured to communicate with a user application, such as can run on a smartphone, table, or other portable device, which provides a user interface. In at least one embodiment, the controller can be operatively coupled to a remote server which provides a user interface, such as a webpage available over the Internet.

In at least one embodiment, a user can specify the quantity or quantities of the product(s) through the user interface. In at least one embodiment, a user can pay for the specified quantity or quantities of the product(s) through the user interface. In at least one embodiment, a user can initiate dispensing of the specified quantity or quantities of the product(s) through the user interface. In at least one embodiment, a user can specify the quantity or quantities of the product(s) by weight, volume, price, nutritional content, by recipe, or any combination thereof.

In at least one embodiment, the controller can monitor the product quantities and facilitate replenishment of the product quantities. For example, in at least one embodiment, the controller can be operatively coupled to a server configured to monitor the product quantities, report the product quantities to an operator, and thereby facilitate replenishment of the product quantities.

In at least one embodiment, a system for dispensing products can include one or more product containers, each having a sealing dispenser port for containing a product. In at least one embodiment, the sealing dispenser port can be configured to selectively seal the product container and selectively dispense the product from the product container. In at least one embodiment, the sealing dispenser port can selectively provide an airtight seal for the product container, thereby preventing contamination of the product. In at least one embodiment, the system can include a housing having a product container cavity for removably receiving the product container, a quantity sensor for detecting a product quantity within the product container, and a sealing dispenser port actuator for selectively dispensing the product from the product container. In at least one embodiment, the system can include a controller configured to monitor the quantity sensor and selectively open the sealing dispenser port to dispense a specified quantity of the product.

In at least one embodiment, the product container can include an identification tag. In at least one embodiment, the housing can include an identification sensor. In at least one embodiment, the controller can monitor the identification sensor and identify the product contained in the product container using the identification sensor and the identification tag.

In at least one embodiment, the product container can include a product driver to selectively shift the product contained in the product container toward the sealing dispenser port of the product container. In at least one embodiment, the housing can include a product driver actuator. In at least one embodiment, the controller can selectively energize the product driver actuator and thereby cause the product driver to shift the product toward the sealing dispenser port of the product container.

In at least one embodiment, the first quantity sensor can detect a weight of the product container. In at least one embodiment, the controller can determine the product quantity within first product container using the quantity sensor. In at least one embodiment, the controller can determine a quantity of the product dispensed from the product container using the quantity sensor. For example, in at least one embodiment, the controller can determine when the specified quantity of the product has been dispensed from the product container using the quantity sensor. For example, in at least one embodiment, the specified quantity can be dispensed by monitoring a weight of the product container as the product is being dispensed.

In at least one embodiment, the housing can include a product dispensing station positioned below the sealing dispenser port of the product container. In at least one embodiment, the product dispensing station can selectively receive and support a rigid transportation container. In at least one embodiment, the product dispensing station can selectively receive, support, and hold open a flexible transportation container.

In at least one embodiment, the housing can include a product view port positioned above the product dispensing station. In at least one embodiment, the product view port can provide an indication of the product contained in the product container.

In at least one embodiment, the housing can include a second product dispensing station positioned next to, or below, a first product dispensing station and below a second sealing dispenser port of a second product container. In at least one embodiment, the second product dispensing station can selectively receive and support a rigid transportation container. In at least one embodiment, the second product dispensing station can selectively receive, support, and hold open a flexible transportation container. In at least one embodiment, the housing can include a vending sensor to detect proper placement of a transportation container below the sealing dispenser port and/or confirm that the transportation container is ready to receive the product.

In at least one embodiment, the housing can include a touchscreen display configured to provide a user interface. In at least one embodiment, the controller can include a wireless communications module configured to communicate with a user application, which may operate on a portable user device, to provide a user interface. In at least one embodiment, the controller can be operatively coupled to a local or remote server that provides a user interface, such as through a web page available on the Internet. In at least one embodiment, the controller can receive an indication of the specified quantity from a user over the Internet and/or a wireless communication link.

In at least one embodiment, the user interface can allow a user to select which ones of a plurality of products contained in the product containers. In at least one embodiment, the user interface can allow a user to specify the specify one or more quantities of the product(s) to be dispensed from the product containers. In at least one embodiment, the user interface can allow a user to pay for the specified quantity or quantities of the product(s). In at least one embodiment, the user interface can allow a user to initiate dispensing of the specified quantity of the first product.

In at least one embodiment, the user interface can allow a user to specify the specified quantity or quantities of the product(s) by choosing a price, a weight, a volume, a nutritional content, or any combination thereof. In at least one embodiment, the user interface can allow a user to specify the specified quantity or quantities of the product(s) by identifying a recipe.

In at least one embodiment, the controller can monitor the product quantity and facilitate replenishment of the product quantity within the product container. For example, in at least one embodiment, the controller can be operatively coupled to a server which can monitor the product quantity within the product container, report the product quantity to an operator, and thereby facilitate replenishment of the product quantity within the product container. In at least one embodiment, the controller can monitor the product quantity within the product container, be operatively coupled to a server configured to report the product quantity to an operator, and thereby facilitate replenishment of the product quantity within the product container. In at least one embodiment, replenishment of the product quantity within the product container can comprise replacement of the product container, such as with a full container stored within the housing. In at least one embodiment, the controller and/or the server are mounted within the housing.

In at least one embodiment, a method of dispensing a product can include receiving one or more product containers into one or more cavities of a housing; identifying one or more products within the one or more product containers using one or more tags on the one or more product containers; receiving an order for one or more of the products from a user, the order specifying a quantity or quantities of the one or more products; dispensing the specified quantity or quantities of the one or more products by monitoring a change in a weight of the one or more product containers; sealing the one or more product containers after dispensing the specified quantity or quantities of the one or more products; or any combination thereof.

In at least one embodiment, identifying the product(s) comprises reading on or more electronic tags, such as an RFID tag. In at least one embodiment, the order can be received through a touchscreen user interface attached to the housing. In at least one embodiment, the order can be received through wireless communications and/or over the Internet. In at least one embodiment, the order can specify the specified quantity of the product by weight, volume, price, nutritional content, recipe, or any combination thereof.

In at least one embodiment, the method can include triggering a notification when the weight of one or more of the product containers drops below a threshold. In at least one embodiment, the method can include triggering a product driver to drive product towards a dispensing port of the one or more product containers. For example, in at least one embodiment, the method can include triggering a product driver to drive the product within one of the product containers towards a dispensing port of that product container, when the weight of that product container drops below a threshold. In at least one embodiment, the method can include triggering a product driver to drive product towards a dispensing port of the one or more product containers, during dispensing of product from that product container.

In at least one embodiment, the method can include providing a user with an indication of where to place a transportation container to contain the specified quantity of the product(s). For example, in at least one embodiment, the method can include providing a user with an indication of where to place a transportation container to contain the specified quantity of the product(s), between receiving the order and dispensing the product.

In at least one embodiment, the method can include providing a user with an indication of a transportation container size necessary to contain the specified quantity of the product(s). For example, in at least one embodiment, the method can include providing a user with an indication of a transportation container size necessary to contain the specified quantity of the product(s), between receiving the order and dispensing the product.

In at least one embodiment, the method can include confirming proper placement of a transportation container below a dispensing port of a product container before dispensing of the product in that product container. In at least one embodiment, the method can include confirming payment for the specified quantity before dispensing of the product in that product container.

In at least one embodiment, the method can include detecting a presence of the user. For example, in at least one embodiment, the method can include detecting a presence of the user, between receiving the order and dispensing the product. In at least one embodiment, the method can include sealing the specified quantity of the first product within a transportation container; preventing access to the transportation container; detecting a presence of the user; and thereafter providing access to the transportation container.

DETAILED DESCRIPTION OF THE INVENTION

Figure 1:
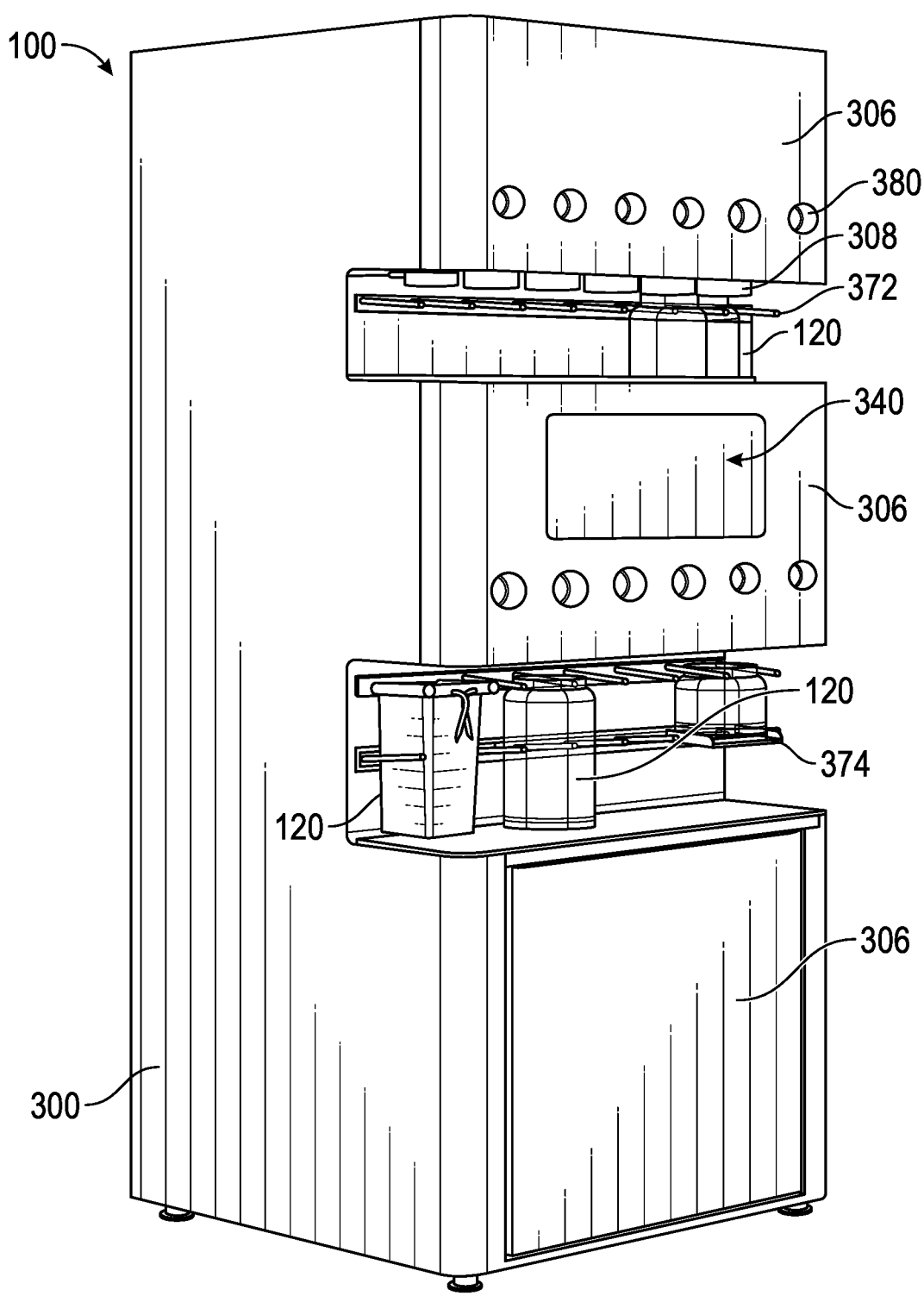
FIG. 1 is a perspective view of one of many embodiments of a dispenser system according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Process flowcharts discussed herein illustrate the operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Figure 2:
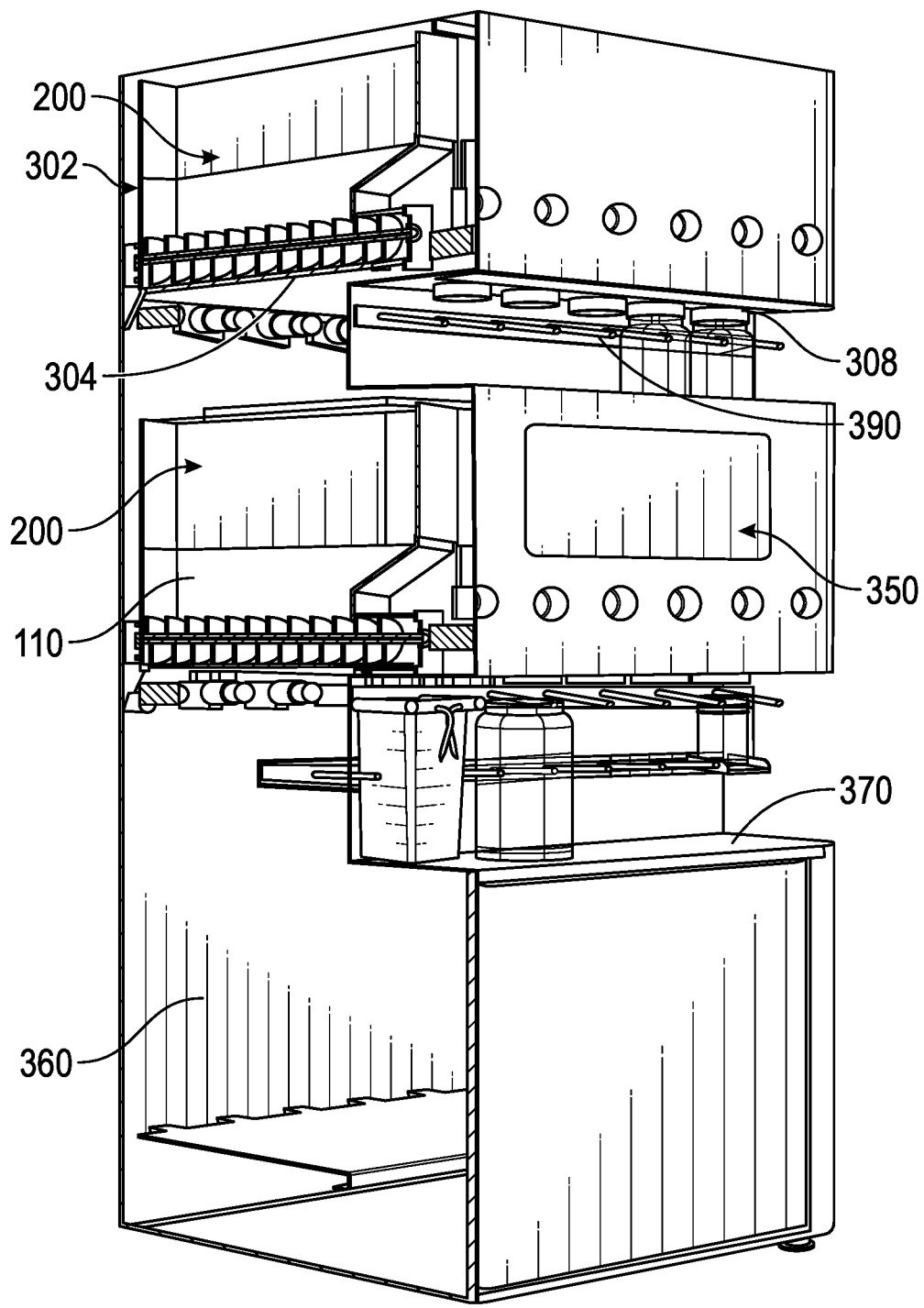
FIG. 2 is a cut-away view of one of many embodiments of a dispenser system according to the disclosure.
Figure 3:
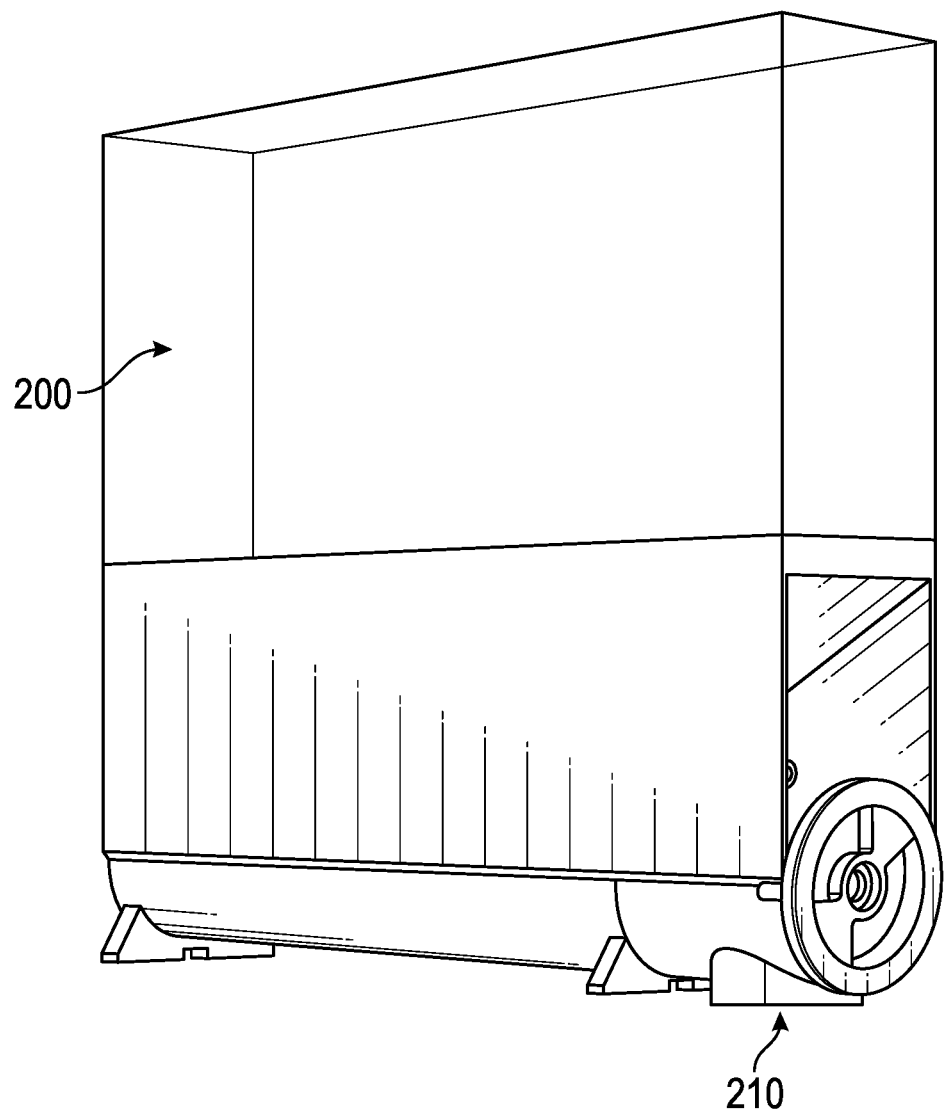
FIG. 3 is a front perspective view of one of many embodiments of a product container according to the disclosure.
Figure 4:
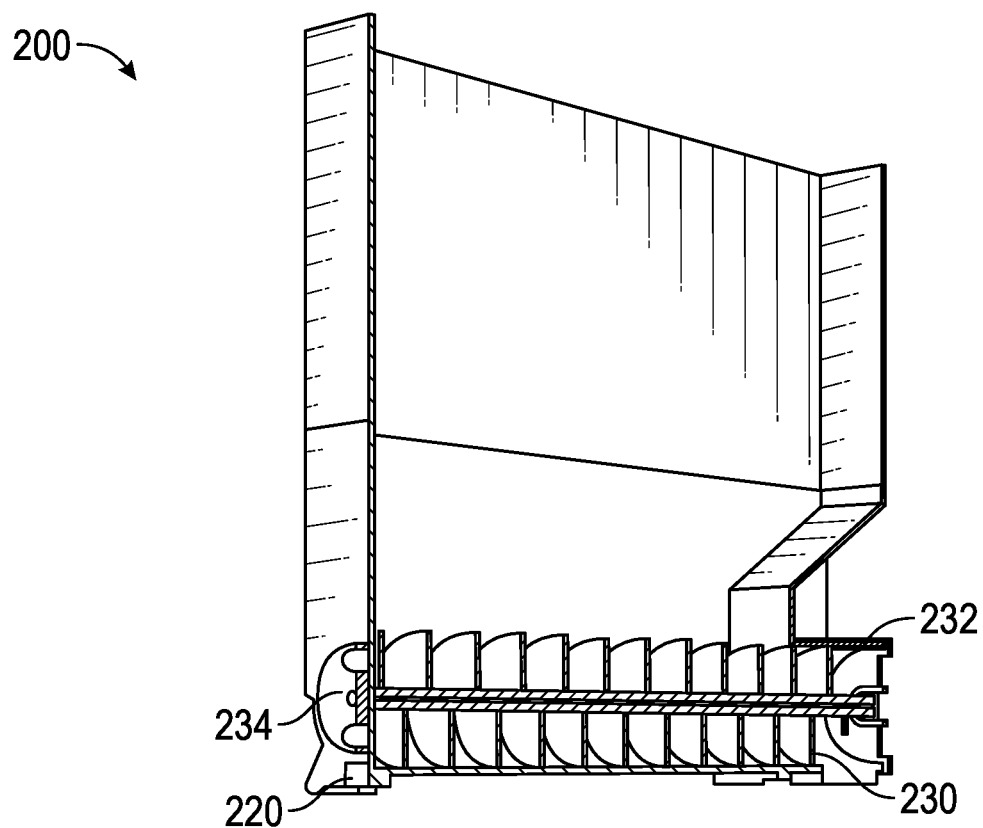
FIG. 4 is a cut-away view of one of many embodiments of a product container according to the disclosure.
Figure 5:
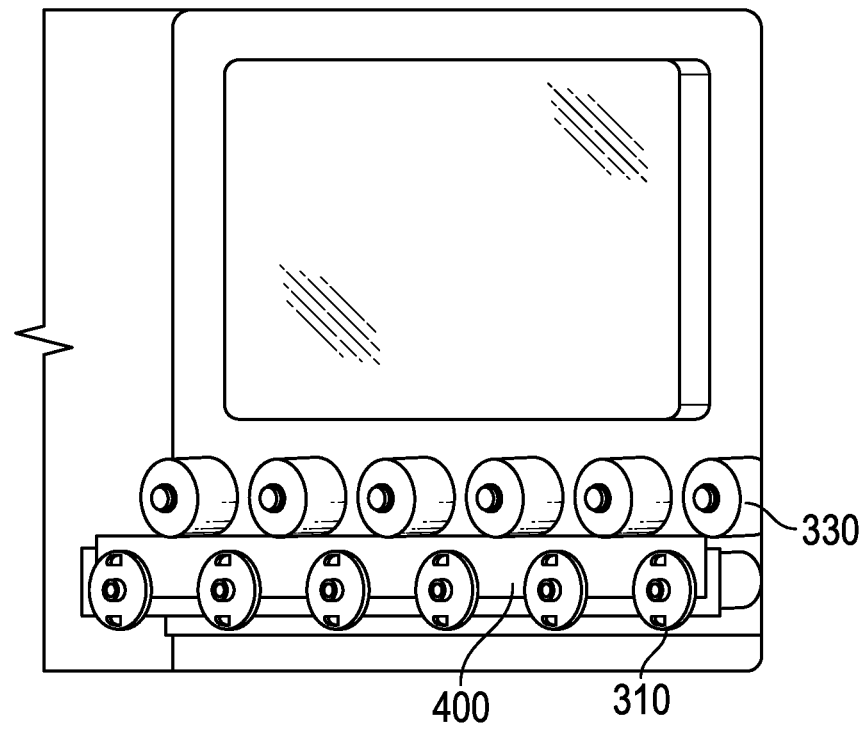
FIG. 5 is a partial perspective view of one of many embodiments of a dispenser system according to the disclosure.
Figure 6:
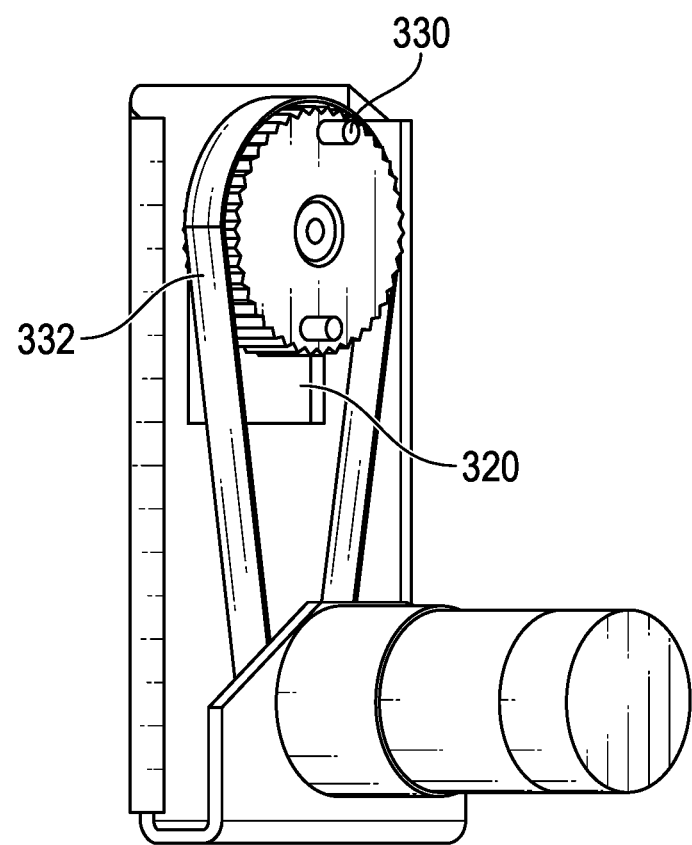
FIG. 6 is a partial perspective view of one of many embodiments of a dispenser system according to the disclosure.
Figure 7:
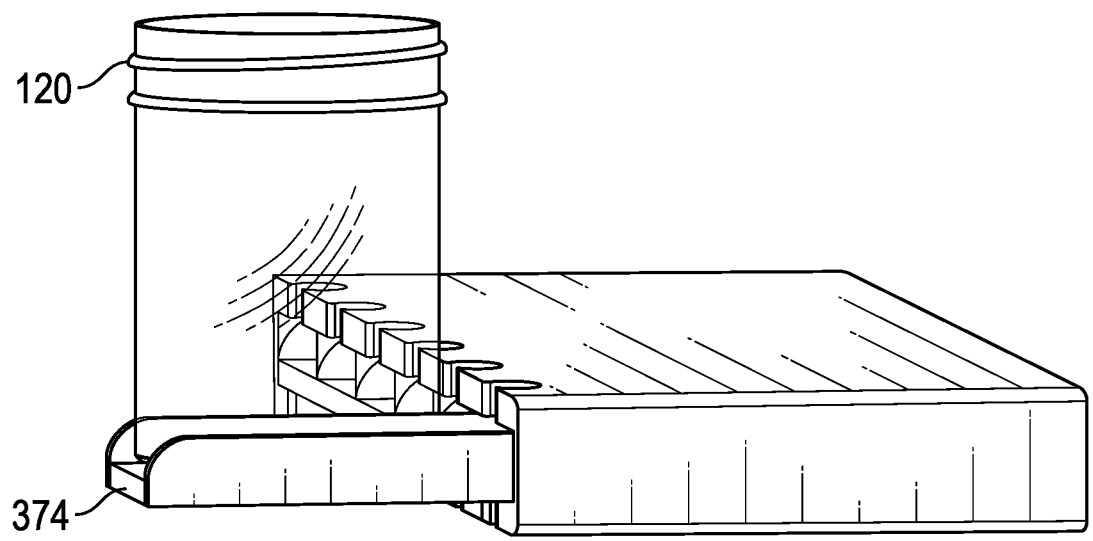
FIG. 7 is a side perspective view of one of many embodiments of a dispenser station according to the disclosure.
Figure 8:
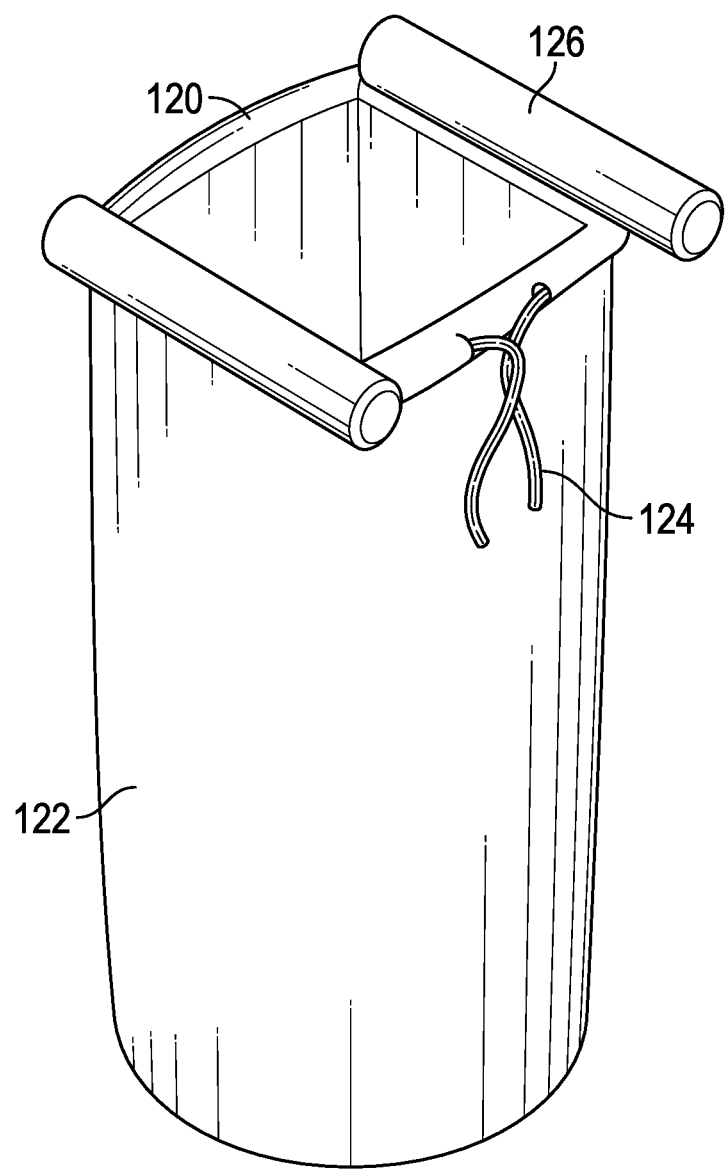
FIG. 8 is a front perspective view of one of many embodiments of a transport container according to the disclosure.
Figure 9:
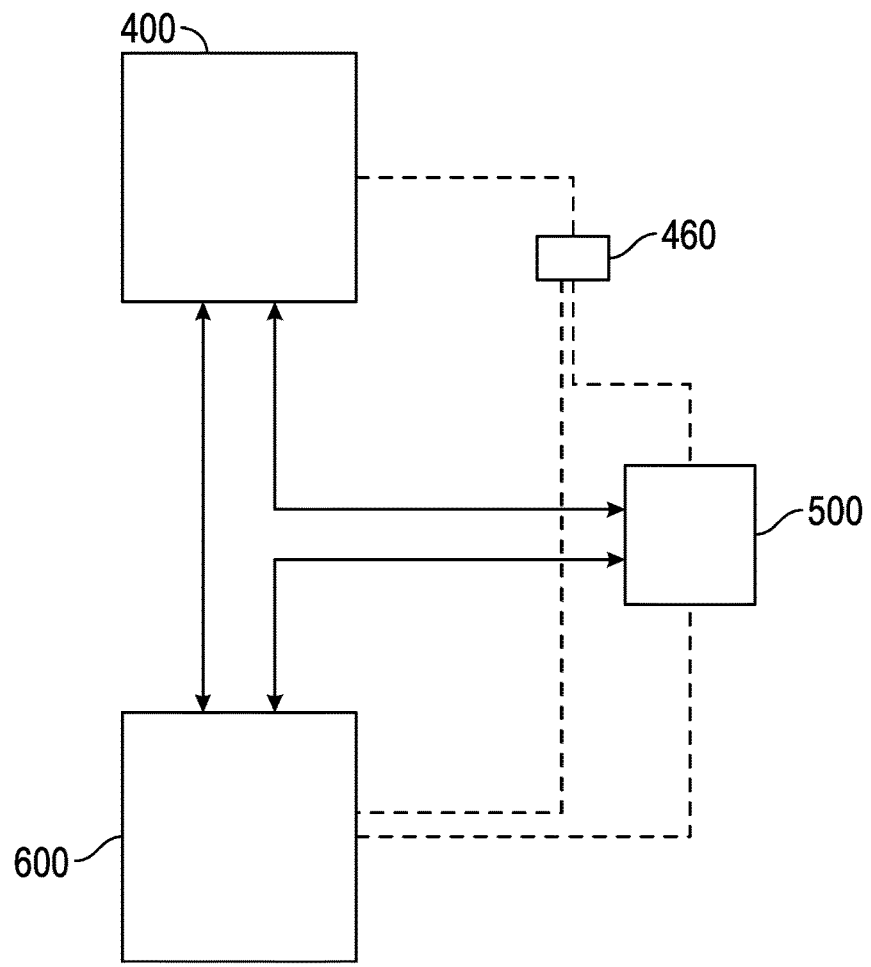
FIG. 9 is a partial schematic diagram of one of many embodiments of a dispenser system according to the disclosure.
Figure 10:
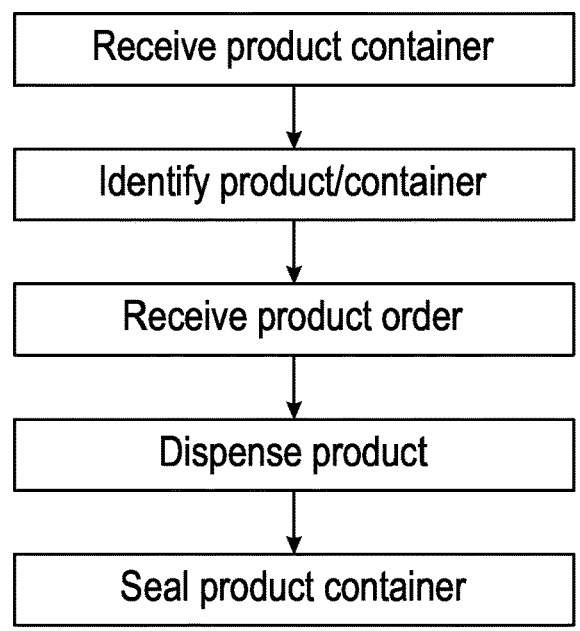
FIG. 10 is a partial flow chart of one of many embodiments of a dispensing method according to the disclosure.
Figure 11:
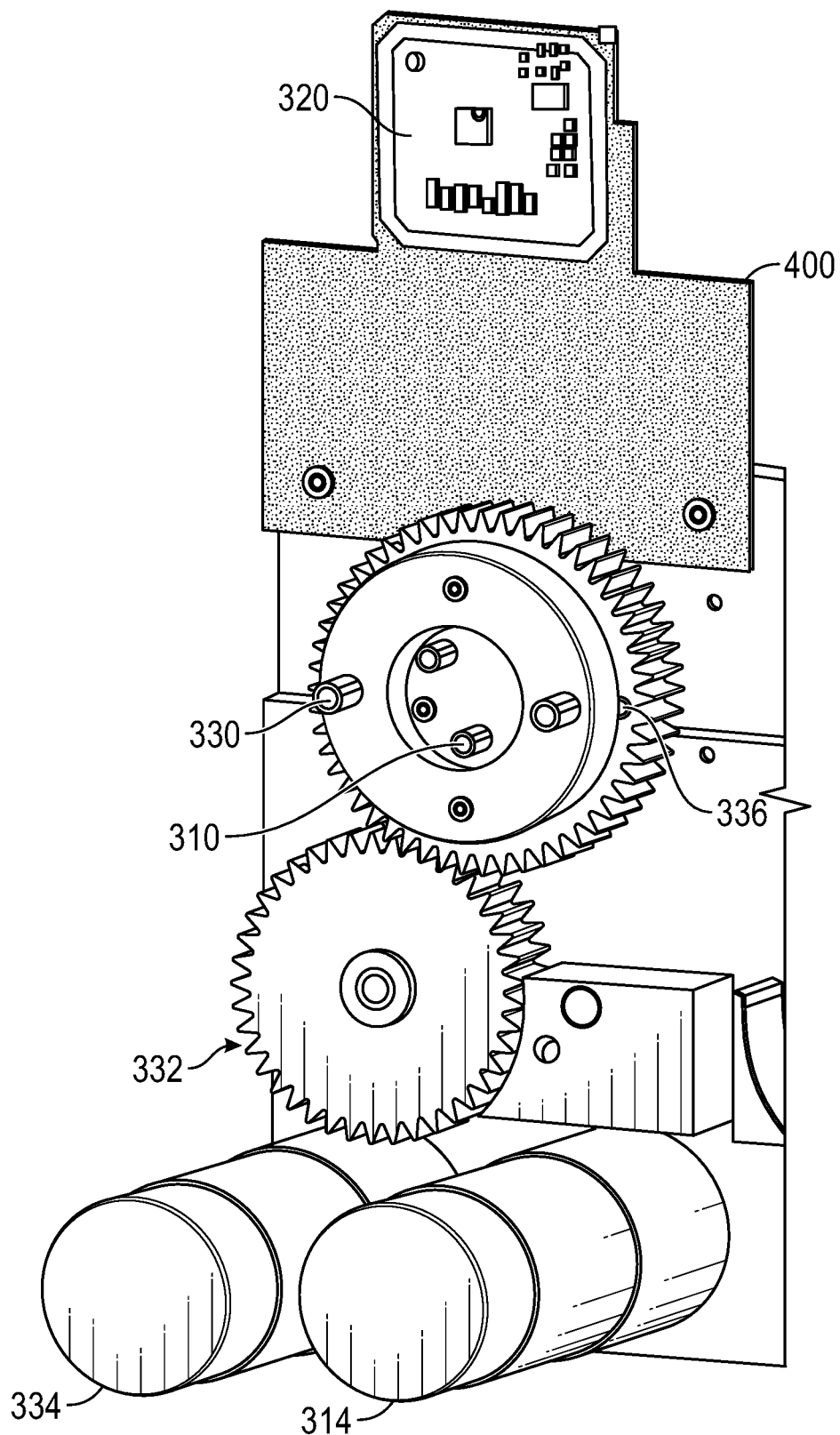
FIG. 11 is a partial perspective view of one of many embodiments of drive components for use with a dispenser system according to the disclosure.
Figure 12:
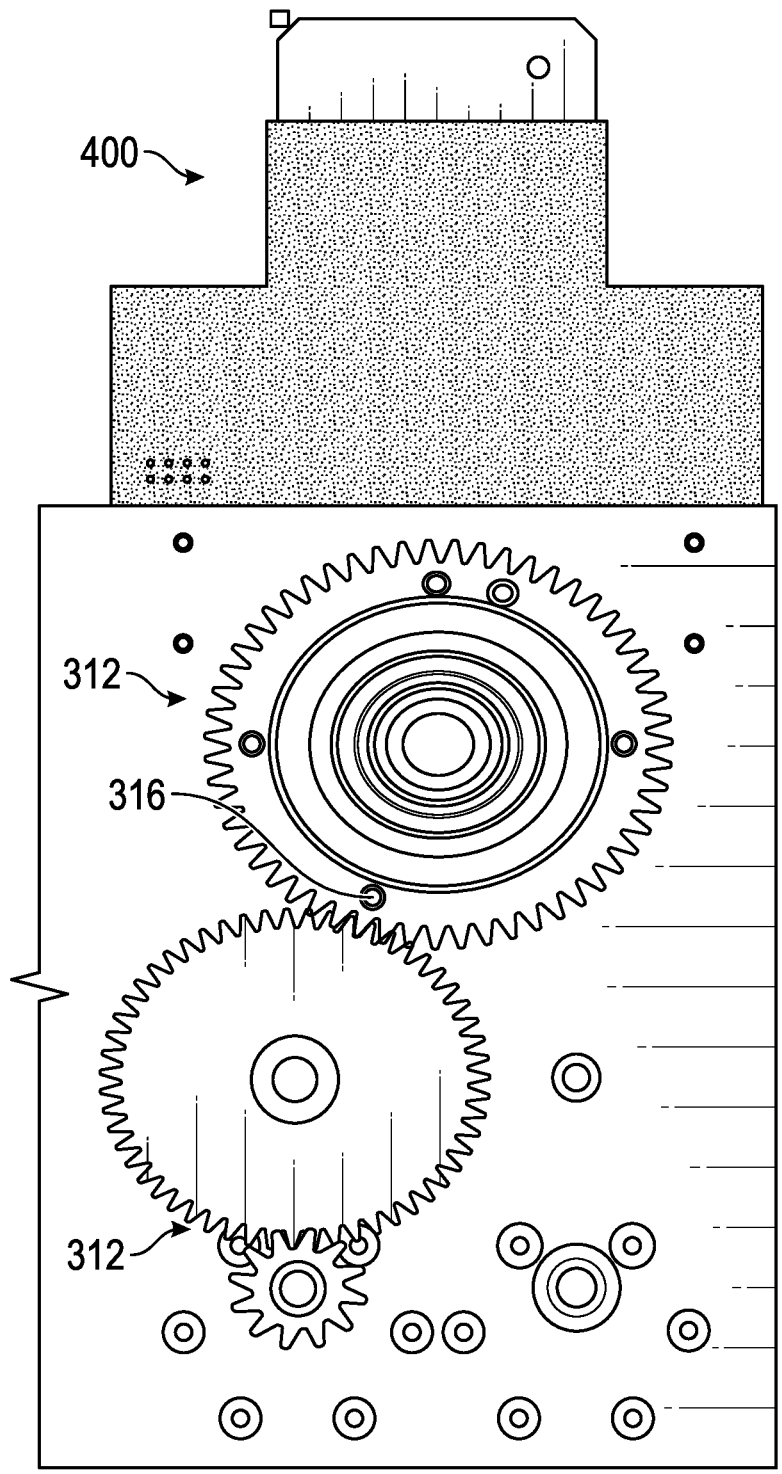
FIG. 12 is an opposite elevation view of the drive components of FIG. 11.
Figure 13:
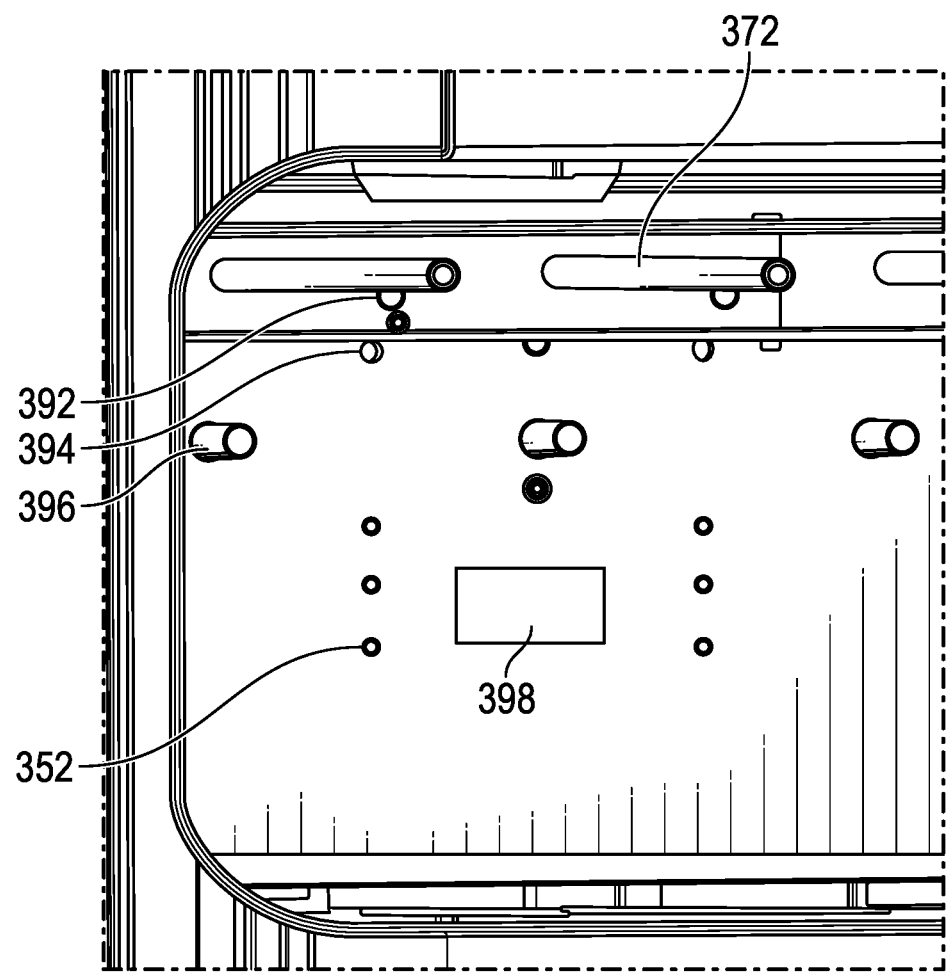
FIG. 13 is a front elevation view of one of many embodiments of a dispenser station according to the disclosure.
Figure 14:
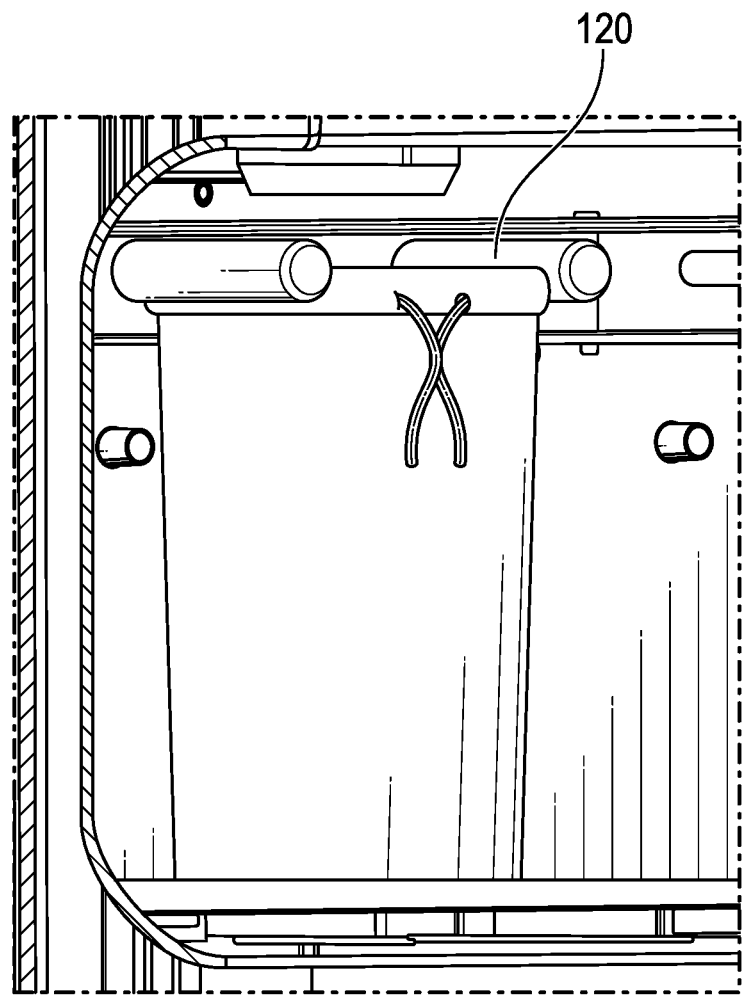
FIG. 14 is another front elevation view of one of many embodiments of a dispenser station according to the disclosure.
Figure 15:
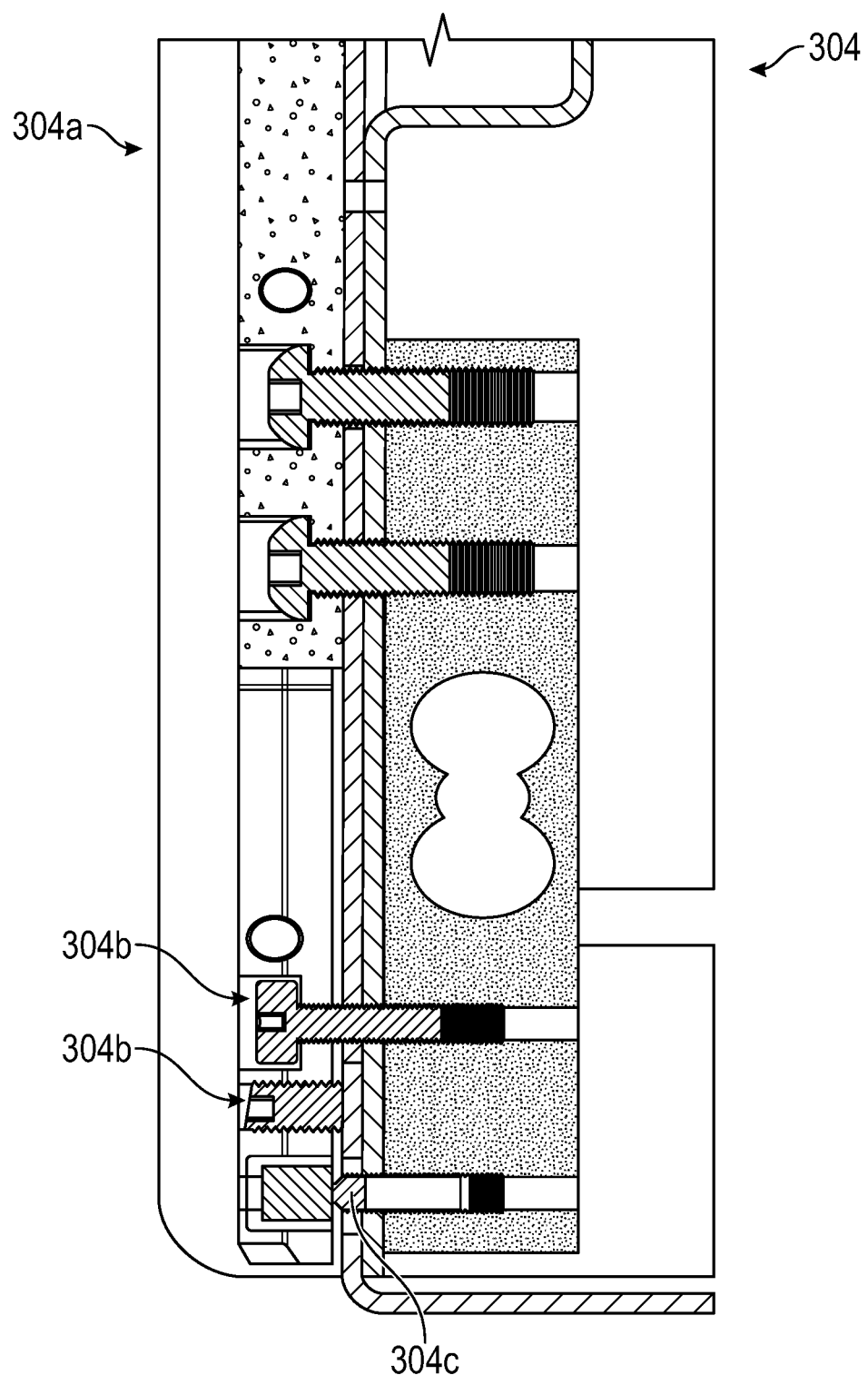
FIG. 15 is a partial cut-away view of a sensor assembly for use with a dispenser system according to the disclosure.
Figure 16:
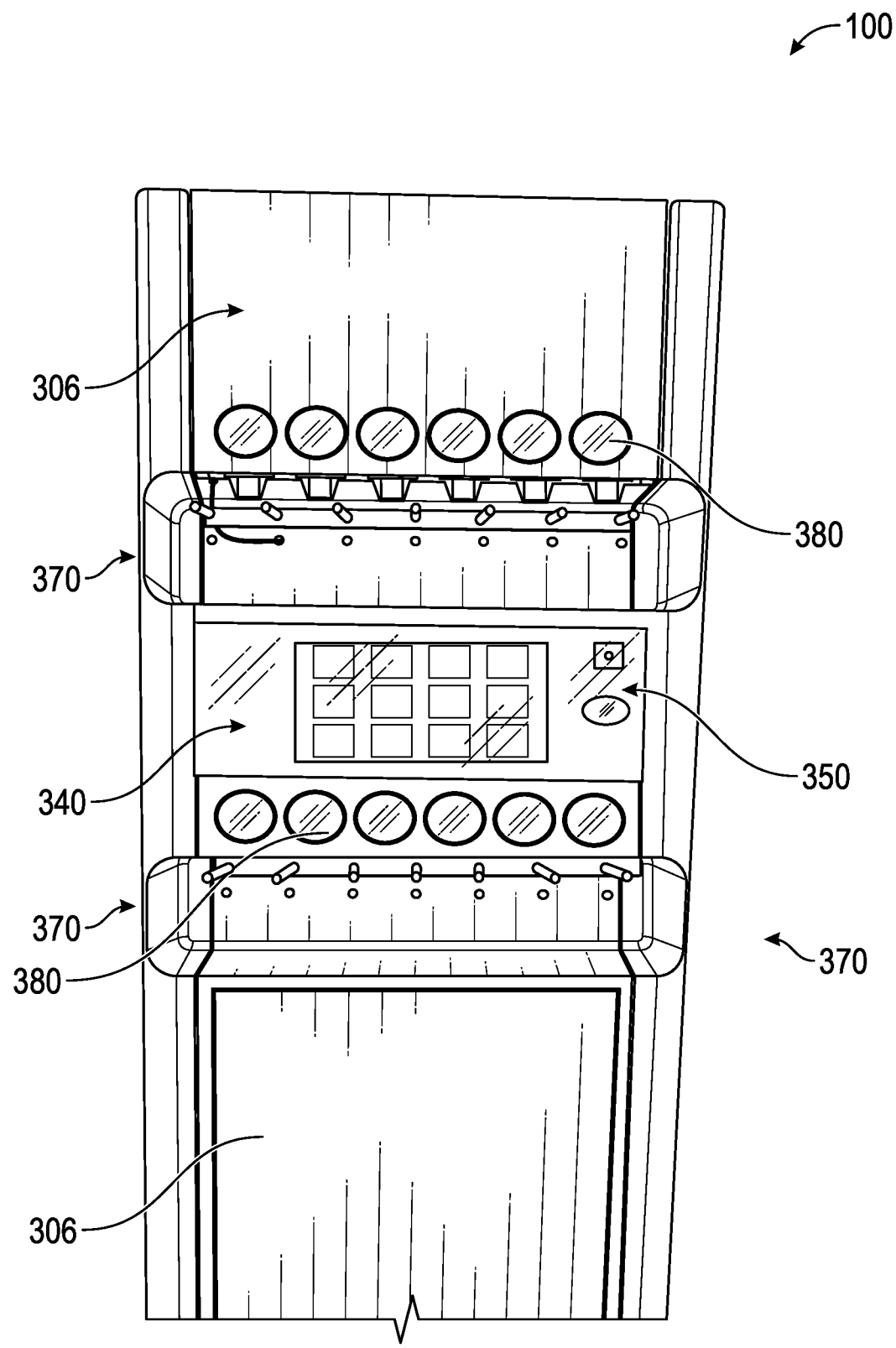
FIG. 16 is a front elevation view of one of many embodiments of a dispenser system according to the disclosure.
Figure 17:
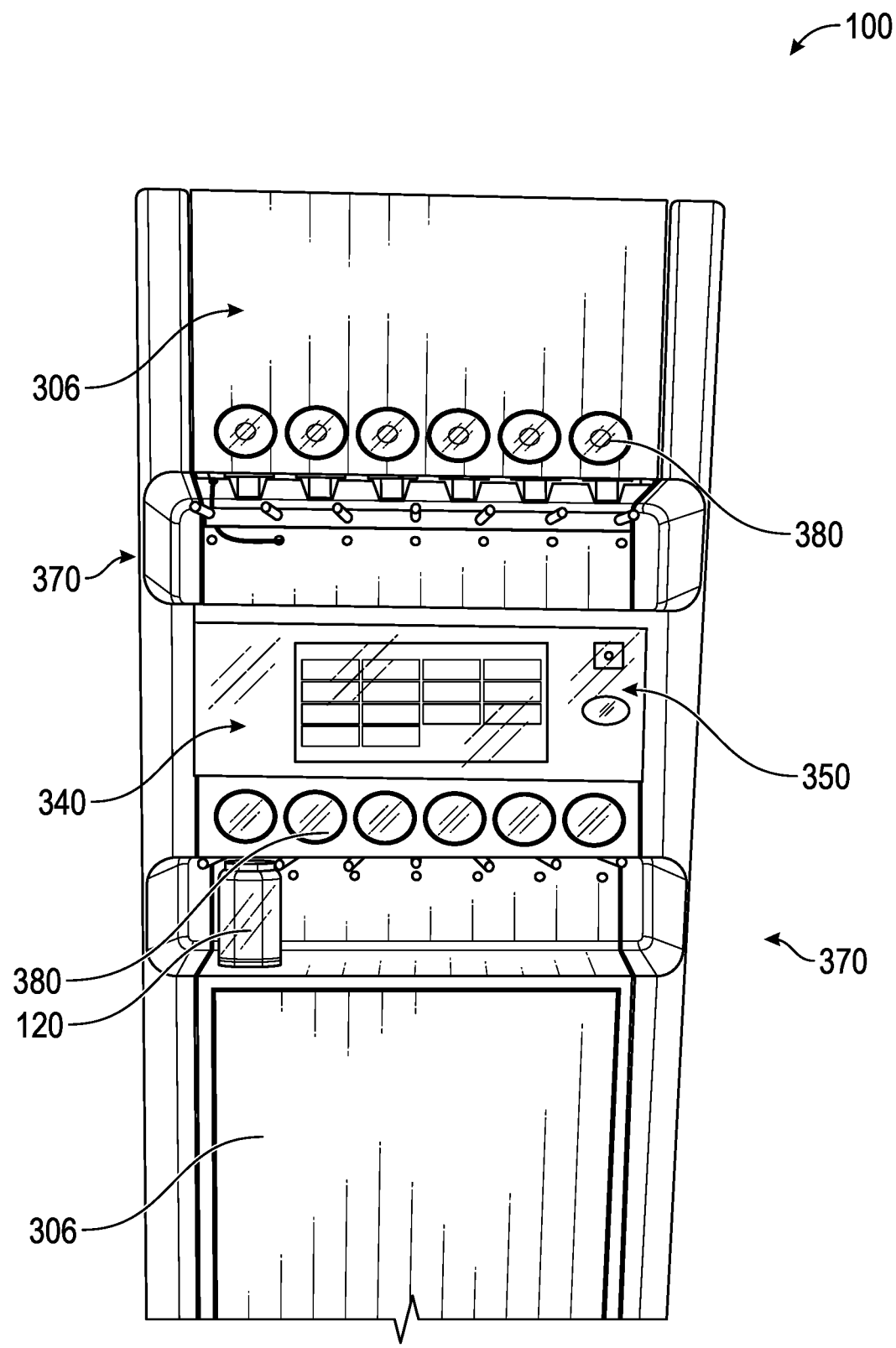
FIG. 17 is another front elevation view of one of many embodiments of a dispenser system according to the disclosure.
Figure 18:
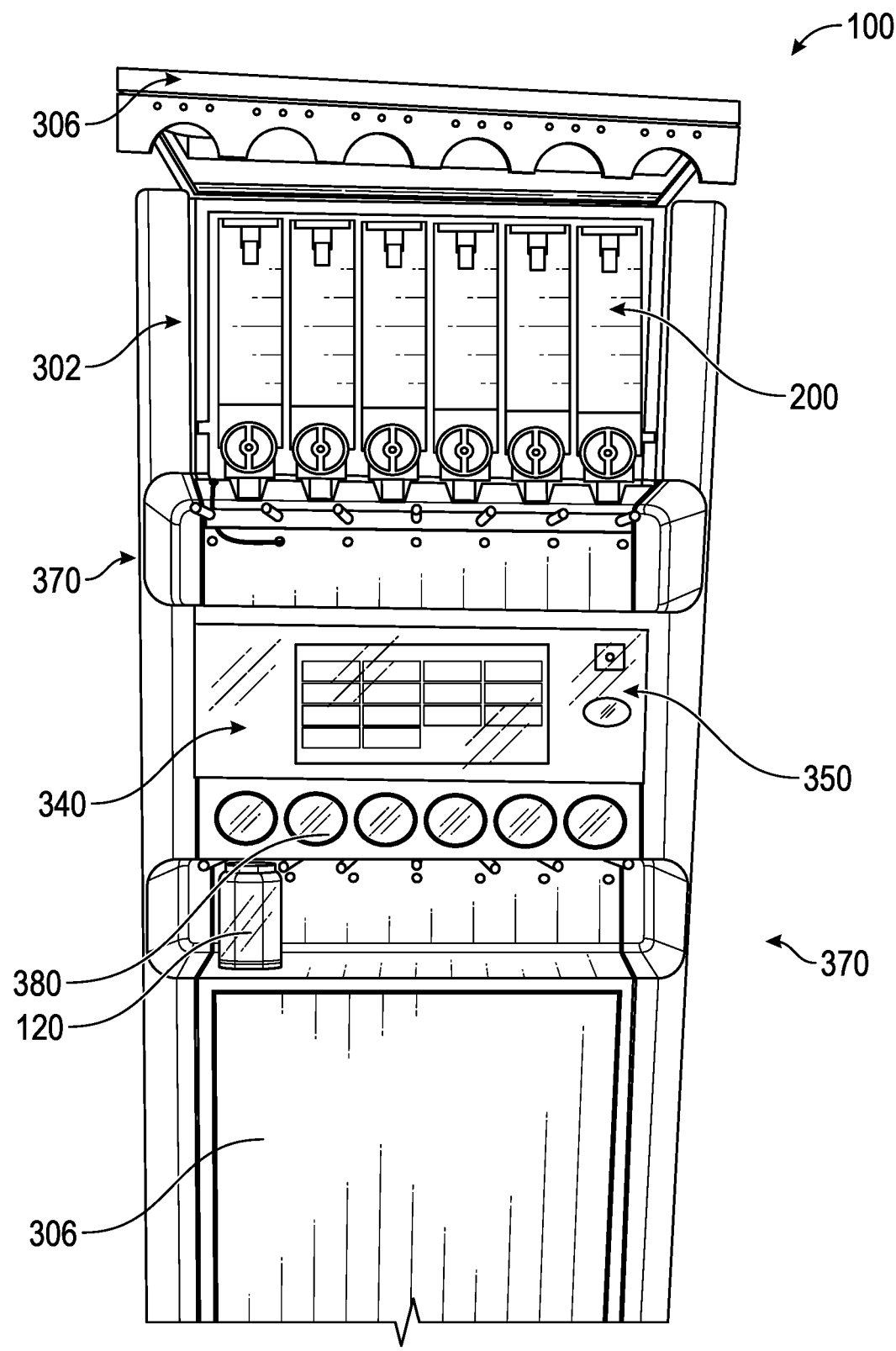
FIG. 18 is a front elevation view of one of many embodiments of a dispenser system, with an access door open, according to the disclosure.

FIG. 1 is a front perspective view of one of many embodiments of a dispenser system according to the disclosure. FIG. 2 is a cut-away view of one of many embodiments of a dispenser system according to the disclosure. FIG. 3 is a front perspective view of one of many embodiments of a product container according to the disclosure. FIG. 4 is a cut-away view of one of many embodiments of a product container according to the disclosure. FIG. 5 is a partial perspective view of one of many embodiments of a dispenser system according to the disclosure. FIG. 6 is a partial perspective view of one of many embodiments of a dispenser system according to the disclosure. FIG. 7 is a side perspective view of one of many embodiments of a dispenser station according to the disclosure. FIG. 8 is a front perspective view of one of many embodiments of a transport container according to the disclosure. FIG. 9 is a partial schematic diagram of one of many embodiments of a dispenser system according to the disclosure. FIG. 10 is a partial flow chart of one of many embodiments of a dispensing method according to the disclosure. FIG. 11 is a partial perspective view of one of many embodiments of drive components for use with a dispenser system according to the disclosure. FIG. 12 is an opposite elevation view of the drive components of FIG. 11. FIG. 13 is a front elevation view of one of many embodiments of a dispenser station according to the disclosure. FIG. 14 is another front elevation view of one of many embodiments of a dispenser station according to the disclosure. FIG. 15 is a partial cut-away view of a sensor assembly for use with a dispenser system according to the disclosure. FIG. 16 is a front elevation view of one of many embodiments of a dispenser system according to the disclosure. FIG. 17 is another front elevation view of one of many embodiments of a dispenser system according to the disclosure. FIG. 18 is a front elevation view of one of many embodiments of a dispenser system, with an access door open, according to the disclosure. FIGS. 1-18 are described in conjunction with one another.

Applicants have created new and useful devices, systems and methods for dispensing goods.

In at least one embodiment, a system 100 for dispensing products can include first and second product containers 200, each having a sealing dispenser port 210 for containing a product 110 therein; a housing 300 having first and second product container cavities 302 to selectively receive either the first of the second product container 200; a controller 400 configured to identify which product 110 is in which product container cavity 302 and open the sealing dispenser ports 210 to selectively dispense a specified quantity of the first product 200 and a specified quantity of the second product 200.

In at least one embodiment, the controller 400 can be mounted to the housing 300. For example, in at least one embodiment, the controller 400 can be mounted within the housing 300. In at least one embodiment, the controller 400 can be mounted outside the housing 300. In at least one embodiment, the controller 400 can be mounted remote from the housing 300. In at least one embodiment, a controller 400 can monitor and/or control multiple housings 300.

In at least one embodiment, one or more of the product containers 200 can include an identification tag 220 and the housing 300 can include an identification sensor 320 associated with each product container cavity 302. In at least one embodiment, the controller 400 can identify which product container 200 is in which cavity 302 using the identification tags 220 and the identification sensors 320. In at least one embodiment, the controller 400 can identify which product 110 is in which cavity 302 using the identification tags 220 and the identification sensors 320.

In at least one embodiment, one or more of the dispenser ports 210 can selectively seal the respective product container 200 and/or dispense the product 110 from the respective product container 200. In at least one embodiment, the controller 400 can be configured to selectively open the sealing dispenser ports 210 to selectively dispense specified quantities of each of the products 110. For example, the housing 300 can include one or more sealing dispenser port actuators 310 for selectively dispensing the product(s) 110 from the product container cavities 302. In at least one embodiment, the dispenser port actuator(s) 310 can include a port linkage 312, such as a belt, gears, another linkage component or components, or any combination thereof. In at least one embodiment, the dispenser port actuator(s) 310 can include one or more motor(s) 314, position sensor(s) 316, or any combination thereof.

In at least one embodiment, the controller 400 can selectively trigger the port actuators 310 to open the sealing dispenser ports 210 to selectively dispense specified quantities of each of the products 110. In at least one embodiment, the housing 300 can include one or more nozzles 308 to direct flow of the product 110 from the sealing dispenser ports 210 of the containers 200. In at least one embodiment, nozzles 308 can be detachably held in place adjacent the dispenser ports 210 using mechanical fasteners, a slotted groove, magnetics, or any combination thereof. As such, the nozzles 308 can be easily replaced, such as when changing product containers 200 and/or the product 110 (thereby avoiding allergen or other contamination).

In at least one embodiment, the housing 300 can include one or more quantity sensors 304 associated with the product container cavities 302, with each quantity sensor 304 detecting a product quantity within the respective product container cavity 302. In at least one embodiment, the controller 400 can be configured to selectively open the sealing dispenser ports 210 to selectively dispense specified quantities of each of the products 110 based at least in part on the quantity sensors 304. For example, in at least one embodiment, quantity sensors 304 comprise load cells, or other weight sensors, that weight the containers 200 in the cavities 302. In at least one embodiment, the one or more quantity sensors 304 monitor the weight, or quantity of product 110 in the containers 200 in the cavities 302, as the product 110 is being dispensed from the product containers 200 in the cavities 302, and thereby measure the quantity of the product 110 as it is dispensed. In at least one embodiment, the housing 300 can include one or more access doors 306 to access the various sensors, containers, and/or other components of the system 100.

In at least one embodiment, one or more of the product containers 200 can include a product driver 230 configured to selectively shift the product 110 in the product container 200 toward the dispenser port 210. For example, in at least one embodiment, driver 230 can be or include one or more augers rotatably coupled to container 200, such as via one or more rotary seals 232, and can include one or more interconnects 234, such as an auger drive interconnect or coupler, for cooperating with other system components to selectively turn driver 230. In at least one embodiment, the housing 300 can include one or more product driver actuators 330, each associated with one of the product container cavities 302. In at least one embodiment, the product driver actuator(s) 330 can include a driver linkage 332, such as a belt, gears, another linkage component or components, or any combination thereof. In at least one embodiment, the product driver actuator(s) 330 can include one or more motor(s) 334, position sensor(s) 336, or any combination thereof. In at least one embodiment, components of the dispenser port actuator(s) 310 and the product driver actuator(s) 330 can be concentric, mounted on the same side of a structure, mounted on opposite sides of a structure, or any combination thereof.

In at least one embodiment, the controller 400 is further configured to monitor the quantity sensors 304 and energize the product driver actuators 330, and thereby cause the product driver 230 to shift the product 110 in the product container 200 toward the dispenser port 210, based at least in part on the quantity sensors 304. For example, the product may freely flow down the dispenser port 210 and out of the product container 200, when the product container 200 is relatively full. However, as the product container 200 is emptied, the product 110 may not freely flow out of the dispenser port 210. Thus, the product drivers 230 and driver actuators 330 allow the controller 400 to ensure efficient dispensing of the products 110, until the product containers are emptied 200.

In at least one embodiment, the housing 300 can include a touchscreen 340 display providing a user interface 350. In at least one embodiment, the touchscreen 340 can be operatively coupled to the controller 400. In at least one embodiment, the controller 400 can include a wireless communications module 460 configured to communicate with a user application, a user device 500, such as a smartphone, table, or other portable device, which provides a user interface 350. In at least one embodiment, the controller 400 can be operatively coupled to a server 600 which provides a user interface 350, such as a webpage available over the Internet. In at least one embodiment, the server 600 is remote from the housing 300 and communicates with the controller 400, or a local server, wireless communications module 460, a wired communications module, the Internet, or any combination thereof. In at least one embodiment, the server 600 is mounted to (and in some cases within) the housing 300 and communicates with the controller 400 and/or provides one or more functions of the controller 400.

In at least one embodiment, a user can specify the quantity or quantities of the product(s) 110 through the user interface 350. In at least one embodiment, a user can specify the quantity or quantities of the product(s) 110 by weight, volume, price, nutritional content, by recipe, or any combination thereof. For example, in at least one embodiment, the user can specify a desired weight of the product(s) 110 and the controller 400 can monitor one or more weight sensors 304 until that specified/desired weight has left the container 200, and then close/seal the dispenser port 210, thereby dispensing the specified/desired quantity. In at least one embodiment, the controller 400 can calculate a weight based on a user specified volume, price, nutritional content, recipe, or any combination thereof, and monitor one or more weight sensors 304 until that weight has left the container 200, and then close/seal the dispenser port 210, thereby dispensing the specified/desired quantity. In at least one embodiment, the controller 400 can monitor a dispensed volume, detecting when a transport container 120 is full, thereby dispensing the specified/desired quantity.

In at least one embodiment, a user can pay for the specified quantity or quantities of the product(s) 110 through the user interface 350. For example, the user interface 350 can include a credit card reader and our shopping cart functionality. In at least one embodiment, the user interface 350 communicates with an external shopping application or service, such as provided by Amazon or a physical store in which the housing 300 is located. In at least one embodiment, a payment process, allowing the user to pay for the specified quantity or quantities of the product(s) 110, is fully integrated into the user interface 350.

In at least one embodiment, a user can initiate dispensing of the specified quantity or quantities of the product(s) 110 through the user interface 350. For example, the user may press a button or touch the touchscreen 340 to indicate that a transport container 120 is in place and ready to receive the dispensed product 110.

In at least one embodiment, the controller 400 can monitor the product quantities and facilitate replenishment of the product quantities. For example, in at least one embodiment, the controller 400 can be operatively coupled to a server 600 configured to monitor the product quantities, report the product quantities to an operator, and thereby facilitate replenishment of the product quantities. Additional containers 200 can be stored in a storage area 360 of the housing 300. In at least one embodiment, replenishment of the product quantities can be accomplished by replacing an empty container 200 with a full container 200, each of which can be stored in the storage area 360 of the housing 300 and/or periodically replaced and/or refilled. In at least one embodiment, the storage area 360 can be configured to monitor or track one or more aspects of one or more containers 200 stored therein. For example, in at least one embodiment, storage area 360 can include or otherwise be in operative communication with one or more of the sensors, load cells and/or other monitoring components described herein and system 100 can be configured to identify, weigh or otherwise monitor the status of one or more containers 200 disposed in storage area 360, such as for inventory purposes or otherwise.

In at least one embodiment, a system 100 for dispensing products 110 can include one or more product containers 200, each having a sealing dispenser port 210 for containing a product 110. In at least one embodiment, the sealing dispenser port 210 can be configured to selectively seal the product container 200 and selectively dispense the product 110 from the product container 200. In at least one embodiment, the sealing dispenser port 210 can selectively provide an airtight seal for the product container 200, thereby preventing contamination of the product 110 stored there within. In at least one embodiment, the system 100 can include a housing 300 having a product container cavity 302 for removably receiving the product container 200, a quantity sensor 304 for detecting a product quantity within the product container 200, and a sealing dispenser port actuator 310 for selectively dispensing the product from the product container 200. In at least one embodiment, the system 100 can include a controller 400 configured to monitor the quantity sensor 304 and selectively open the sealing dispenser port 210 to dispense a specified quantity of the product 110.

In at least one embodiment, the product container 200 can include an identification tag 220. In at least one embodiment, the housing 300 can include an identification sensor 320. In at least one embodiment, the controller 400 can monitor the identification sensor 320 and identify the product 110 contained in the product container 200 using the identification sensor 320 and the identification tag 220.

In at least one embodiment, the product container 200 can include a product driver 230 to selectively shift the product 110 contained in the product container 200 toward the sealing dispenser port 210 of the product container 200. In at least one embodiment, the housing 300 can include a product driver actuator 330. In at least one embodiment, the controller 400 can selectively energize the product driver actuator 330 and thereby cause the product driver 230 to shift the product 110 toward the sealing dispenser port 210 of the product container 200.

In at least one embodiment, the quantity sensor 304 can detect a weight of the product container 200. In at least one embodiment, the controller 400 can determine the product quantity within product container 200 using the quantity sensor 304. In at least one embodiment, the controller 400 can determine a quantity of the product 110 dispensed from the product container 200 using the quantity sensor 304. For example, in at least one embodiment, the controller 400 can determine when the specified quantity of the product has been dispensed from the product container 200 using the quantity sensor 304. For example, in at least one embodiment, the specified quantity can be dispensed by monitoring a weight of the product container 200 as the product is being dispensed.

In at least one embodiment, the housing 300 can include a product dispensing station 370 positioned below the sealing dispenser port 210 of the product container 200. In at least one embodiment, the product dispensing station 370 can selectively receive and support a rigid transportation container 120. In at least one embodiment, the product dispensing station 370 can selectively receive, support, and hold open a flexible transportation container 120. For example, the product dispensing station 370 can include one or more alignment posts 372 that can align a rigid transportation container 120 and/or suspend a flexible transportation container 120. In at least one embodiment, the product dispensing station 370 can include one or more movable and/or removable shelves 374 to support smaller transportation containers 120 in close proximity to the sealing dispenser port 210 of the product container 200. In at least one embodiment, the flexible transportation container 120 can include a containment bag portion 122, a closure 124, such as a drawstring, one or more alignment sleeves 126 to slide over, or otherwise interact with, the alignment posts 372, or any combination thereof.

In at least one embodiment, the housing 300 can include a product view port 380 positioned above the product dispensing station 370. In at least one embodiment, the product view port 380 can provide an indication of the product 110 contained in the product container 200. In at least one embodiment, the product view port 380 provides a window into the housing 300 allowing a user to view the product container 200, an image thereon, a window therethrough (thereby providing a view of the product 110 contained in the product container 200), or any combination thereof. In at least one embodiment, the product view port 380 provides a pocket into which a sample of the product 110 can be placed. In at least one embodiment, this sample pocket can be detachably held in place adjacent the product view port 380 using mechanical fasteners, a slotted groove, magnetics, or any combination thereof. As such, the sample pocket can be easily replaced, such as when changing product containers 200 and/or the product 110

In at least one embodiment, the housing 300 can include a second product dispensing station 370 positioned next to and/or below a first product dispensing station 370 and below a second sealing dispenser port 210 of a second product container 200. In at least one embodiment, the second product dispensing station 370 can selectively receive and support a rigid transportation container 120. In at least one embodiment, the second product dispensing 370 station can selectively receive, support, and hold open a flexible transportation container 120. In at least one embodiment, the housing 300 can include a vending sensor 390 to detect proper placement of a transportation container 120 below the sealing dispenser port 210 and/or confirm that the transportation container 120 is ready to receive the product 110.

In at least one embodiment, the housing 300 can include a touchscreen display 340 configured to provide a user interface 350. In at least one embodiment, the controller 400 can include a wireless communications module 460 configured to communicate with a user application, which may operate on a portable user device 600, to provide a user interface 350. In at least one embodiment, the controller 400 can be operatively coupled to a local or remote server 600 that provides a user interface 350, such as through a web page available on the Internet. In at least one embodiment, the controller 400 can receive an indication of the specified quantity from a user over the Internet and/or a wireless communication link.

In at least one embodiment, the user interface 350 can allow a user to select which ones of a plurality of products 100 contained in the product containers 200. In at least one embodiment, the user interface 350 can allow a user to specify the specify one or more quantities of the product(s) 110 to be dispensed from the product containers 200. In at least one embodiment, the user interface 350 can allow a user to pay for the specified quantity or quantities of the product(s). In at least one embodiment, the user interface 350 can allow a user to initiate dispensing of the specified quantity of the product(s) 110.

In at least one embodiment, the user interface 350 can allow a user to specify the specified quantity or quantities of the product(s) 100 by choosing a price, a weight, a volume, a nutritional content, or any combination thereof. In at least one embodiment, the user interface 350 can allow a user to specify the specified quantity or quantities of the product(s) 110 by identifying a recipe. In at least one embodiment, the user interface 350 can allow a user to specify the specified quantity or quantities of the product(s) 110 using a price, a weight, a volume, a nutritional content, a recipe, or any combination thereof.

In at least one embodiment, the user interface 350 can allow a user to specify different quantities of different ones of the product(s) 110 using a price, a weight, a volume, a nutritional content, a recipe, or any combination thereof. For example, a user can specify one quantity of one of the products 110, a second quantity of a second one of the products 110, a third quantity of a third one of the products 110, a fourth quantity of a fourth one of the products 110, a fifth quantity of a fifth one of the products 110, etc. In this manner, the system 100 can produce a custom trail mix or fulfill another recipe, as specified or identified by the user. In at least one embodiment, the user interface 350 can present the user with a plurality of recipes from which the user may select. In at least one embodiment, the user interface 350 can allow the user to import or otherwise specify one or more recipes.

In at least one embodiment, the controller 400 can monitor the product quantity and facilitate replenishment of the product quantity within the product container 200. For example, in at least one embodiment, the controller 400 can be operatively coupled to a server 600 which can monitor the product quantity within the product container 200, report the product quantity to an operator, and thereby facilitate replenishment of the product quantity within the product container 200. In at least one embodiment, the controller 400 can monitor the product quantity within the product container 200, be operatively coupled to a server 600 configured to report the product quantity to an operator, and thereby facilitate replenishment of the product quantity within the product container 200. In at least one embodiment, replenishment of the product quantity within the product container 200 can comprise replacement of the product container 200, such as with a full container stored within the housing 300. In at least one embodiment, the controller 400 and/or the server 600 are mounted within the housing 300.

In at least one embodiment, a method of dispensing a product 110 can include receiving one or more product containers 200 into one or more cavities 302 of a housing 300; identifying one or more products 110 within the one or more product containers 200, such as by using one or more tags 220 on the one or more product containers 200; receiving an order for one or more of the products 110 from a user, the order specifying a quantity or quantities of the one or more products 110; dispensing the specified quantity or quantities of the one or more products 100 by monitoring a change in a weight of the one or more product containers 200; sealing the one or more product containers 200 after dispensing the specified quantity or quantities of the one or more products 110; or any combination thereof.

In at least one embodiment, identifying the product(s) comprises reading on or more electronic tags 220, such as an RFID tag. In at least one embodiment, the order can be received through a touchscreen user interface 350 attached to the housing 300. In at least one embodiment, the order can be received through wireless communications and/or over the Internet. In at least one embodiment, the order can specify the specified quantity of the product 110 by weight, volume, price, nutritional content, recipe, or any combination thereof.

In at least one embodiment, the method can include triggering a notification when the weight of one or more of the product containers 200 drops below a threshold. In at least one embodiment, the method can include triggering a product driver 230 to drive product 110 towards a dispensing port 210 of the one or more product containers 200. For example, in at least one embodiment, the method can include triggering a product driver 230 to drive the product 110 within one of the product containers 200 towards a dispensing port 210 of that product container 200, when the weight of that product container 200 drops below a threshold. In at least one embodiment, the method can include triggering a product driver 230 to drive product 110 towards a dispensing port 210 of the one or more product containers 200, during dispensing of product 110 from that product container 200.

In at least one embodiment, the method can include providing a user with an indication of where to place a transportation container 120 to contain the specified quantity of the product(s) 110. In at least one embodiment, the system 100 can utilize light emitting diodes 352, or other lights, located near or within the dispensing station(s) 370 to provide the indication of where to place a transportation container 120. For example, in at least one embodiment, the method can include providing a user with an indication of where to place a transportation container 120 to contain the specified quantity of the product(s) 110, between receiving the order and dispensing the product 110. This indication can include an indication of into which dispensing station 370 the transport container 120 should be placed. In at least one embodiment, such as where the user has specified one or more quantities of two or more of the product(s) 110, the user interface 350 can provide the user with an indication of into which dispensing station 370 the transport container 120 should be placed, when and/or in what order. In at least one embodiment, the user interface 350 can provide the user with an indication of into which dispensing station 370 the transport container 120 should be placed and/or when, using lights, still and/or video images, audible clues, or any combination thereof.

In at least one embodiment, this indication can include an indication of how to use the dispensing station 370 and/or how to arrange the transport container 120. For example, the user interface 350, or some other component of the system 100, can provide the user with a video and/or audio tutorial. In at least one embodiment, the user interface 350, or some other component of the system 100, can provide the user with allergen warnings where the user has supplied the necessary information. For example, some premixed trail mixes may contain certain nuts and/or fruits that may not be obvious. The user interface 350, or some other component of the system 100, can provide the user with a warning when a product the user has selected contains any known allergens, such as common allergies and/or known allergies of the user or their household.

In at least one embodiment, the method can include providing a user with an indication of a transportation container size necessary to contain the specified quantity of the product(s) 110. For example, in at least one embodiment, the method can include providing a user with an indication of a transportation container size necessary to contain the specified quantity of the product(s) 110, between receiving the order and dispensing the product 110. For example, when a user specifies the specified quantity of the product(s) 110 by weight, price, nutritional content, recipe, or any combination thereof, the controller 400 can calculate the volume of the specified quantity of the product(s) 110 and provide an indication of that volume to the user, such as through the user interface 350, thereby indicating size transportation container 120 is necessary.

In at least one embodiment, the method can include confirming proper placement of a transportation container 120 below a dispensing port 210 of a product container 200 before dispensing of the product 110 in that product container 200. For example, in at least one embodiment, the system 100 can include one or more vending sensor(s) 390, monitored by the controller 400 for confirming proper placement of a transportation container 120 below a dispensing port 210 of a product container 200 before dispensing of the product 110 in that product container 200.

In at least one embodiment, the vending sensor(s) 390 can include one or more magnetic sensor(s) 392, one or more proximity sensor(s) 394, one or more other sensor(s) 396, one or more RIFD sensor(s) 398, or any combination thereof. In at least one embodiment, the magnetic sensor(s) 392, the proximity sensor(s) 394, the other sensor(s) 396, or any combination thereof can be used to insure proper placement of the transport container 120. In at least one embodiment, the RIFD sensor(s) 398 can be used detect the presence of the transport container 120, identify the transport container 120, track the use/reuse of the transport container 120, or any combination thereof.

In at least one embodiment, the method can include confirming payment for the specified quantity before dispensing of the product 110 in that product container 200. In at least one embodiment, the method can include detecting a presence of the user. For example, in at least one embodiment, the method can include detecting a presence of the user, between receiving the order and dispensing the product 110. The presence of the user can be detected using global positioning satellites (GPS), proximity sensors, wireless communications, biometric identification, or any combination thereof.

In at least one embodiment, the method can include sealing the specified quantity of the product 110 within a transportation container 120; preventing access to the transportation container 120; detecting a presence of the user; and thereafter providing access to the transportation container 120 containing the product 110. For example, in at least one embodiment, the method can include moving the transportation container 120 from a product dispensing station 370 to the storage area 360 of the housing 300 until the presence of the user is detected and then allowing the user to access the storage area 360 of the housing 300 to retrieve the transportation container 120. In at least one embodiment, access to the storage area 360 of the housing 300 and/or the transportation container(s) 120 (prefilled and/or empty) can be controlled using an onscreen password, wireless connectivity between the controller 400 and the user device 500, biometrics, mechanical locks, or any combination thereof.

In at least one embodiment, the method and/or system 100 can place the dispensing at a convenient position. In at least one embodiment, the method and/or system 100 can minimize the need for personal contact with the system 100 and product 110. In at least one embodiment, the method and/or system 100 can eliminate waste and/or shrinkage thru prepaid dispensing. In at least one embodiment, the method and/or system 100 can automatically track inventory with real-time weighing and/or identification of dispensed product 110. In at least one embodiment, product(s) 110 can be dispensed into flexible, rigid, and/or common containers such as standard canning jars.

Flexible containers can be relatively inexpensive, reusable, cleanable, collapsible, compostable, or any combination thereof. In at least one embodiment, flexible containers can be collapsible, and therefore, when empty, easier to carry and store than typical rigid containers.

Customer service and machine management can be remote and/or onsite. Data can be gathered by the controller 400, user device 500, server 600, or any combination thereof for predictive analysis, inventory management, performance analysis, social cues analysis, customer feedback, etc.

A user (e.g., a customer) of system 100 has the option to register as such, thus making it easier for a user to complete and track transactions, receive/send notifications, and provide feedback. This customer relationship can be utilized to foster accountability, trust, convenience or any combination thereof between the customer and machine operator. Transaction and inventory data can be utilized to foster accountability, trust, convenience or any combination thereof between the system 100 operator and the system 100 owner should they be different.

In at least one embodiment, the method and/or system 100 can provide a useful tool for customers when deciding what and how much product 110 to purchase. The system 100 can dispense based on recipes, weight, volume, price or any combination thereof. Recipes may be referenced, modified, and saved by the registered user. In at least one embodiment, the method and/or system 100 can present the customer information regarding usage, nutrition, possible allergy warnings and safety tips. Product containers 200 can be segmented on an allergen basis.

In at least one embodiment, the method and/or system 100 can be utilized worldwide in both public and private institutions, including but not limited to, anywhere that unpackaged products 110 are distributed. In at least one embodiment, the method and/or system 100 can open new locations for such distribution.

In at least one embodiment, the method and/or system 100 can automate the dispensing of product 110 in a clean and accurate way. In at least one embodiment, the method and/or system 100 can help reduce the use of single use packaging that is clogging the environment, wasting natural resources, and costing the people.

In at least one embodiment, the method and/or system 100 can allow for automated dispensing of product 110. In at least one embodiment, the products 110 are stored in a multitude of replaceable modular product containers 200. In at least one embodiment, the product containers 200 have a product driver 230 to drive product 110 across the product containers 200 to the dispensing port 210 in a controlled manner. In at least one embodiment, the port 210 can provide an airtight seal after dispensing. In at least one embodiment, the product containers 200 interlock with motors that control dispensing and sealing. In at least one embodiment, each product container 200 has an identifier 220 that associates it with product 110 contained within and its particulars. In at least one embodiment, the product containers 200 are contained within a housing 300 that also contains the control circuitry 400 and may contain a monitor 340 that can display, product information, dispensing instructions, order information, advertisements, etc. In at least one embodiment, the base 360 of the housing 300 can store additional product containers 200, product 110, containers 120, or any combination thereof. In at least one embodiment, the system 100 can have an integral server 600 and/or be tied to a remote server 600. In at least one embodiment, the server 600 provides a means to track inventory and product usage, accept payment, automate reorder of stock, act as a customer service portal, take orders, track customers, etc. In at least one embodiment, the product containers 200 rest upon a sensor 304 that continuously weighs each module for evaluating the amount of product 110 that is dispensed or remains. In at least one embodiment, the sensor 304 can be a load cell that measures the weight on a platform 304a upon which a product container 200 is placed. In at least one embodiment, the sensor 304 can include set screws 304b, or the like, to limit travel of the platform 304a. In at least one embodiment, the sensor 304 can include one or more level adjusters 304c, to level the platform 304a. In at least one embodiment, the sensor 304 can include two or more load cells, set screws 304b, level adjusters 304c, or any combination thereof, for each platform 304a and/or each product container 200.

In at least one embodiment, each product container 200 has visual clues to align its internal dispensing and seal system prior to insertion of the product containers 200 into the housing 300. In at least one embodiment, the drives mounted to the respective access door and housing 300 interact with such product containers 200 to automatically position them, such that when a product container 200 is swapped no further alignment is needed. In at least one embodiment, each product container 200 has a unique identifier 220 that is automatically read upon insertion or removal of such product container 200 from the housing 300.

In at least one embodiment, the product containers 200 are filled with product 100 and the product is associated with the product container's 200 identifier 220. In at least one embodiment, the product containers 200 are placed into the housing 300 and the system 100 recognizes the product 110 based on the identifier 220. In at least one embodiment, a sample of the product 110 for each product container 200 may be placed in a see-through container, which is then placed in the housing 300 in its respective place, such as adjacent the appropriate view port 380, as a visual representation for the customer and/or displayed on the screen 340 at the appropriate time. In at least one embodiment, the system 100 identifies and weighs each product container 200 to determine real-time inventory and dispensed amount.

In at least one embodiment, the customer can place an order, such as remotely via a smartphone application, a local Point of Sale system or an integral touchscreen 340. In at least one embodiment, the potential customer can see available inventory, its location and information related to the product 110 as well as pricing and availability. In at least one embodiment, the customer can then prepay and reserve product 110 for dispensing, or order containers 120 prefilled with desired product 110.

In at least one embodiment, the user interface 350 can provide tools for calculating quantities desired based on nutritional requirements, recipes, cost, volume, weight, and the like. In at least one embodiment, proprietary containers 120 and/or standard canning jars 120 can fit on the housing 300 with sensors 390 assuring correct placement and fill.

In at least one embodiment, a customer's presence may be recognized via some type of wireless signal such as Bluetooth and/or GPS or some type of physical interaction with the customer such as a POS system, touchscreen 340, mobile device 500, or motion detector. In at least one embodiment, customer is directed to a particular machine and/or dispensing station 370 to retrieve product 110. In at least one embodiment, additional information and/or visual clues can be presented to the customer, such as so the customer knows where to place the container 120 and verifies that the proper size container 120 is being utilized.

In at least one embodiment, once the system 100 verifies that everything is ready it may automatically dispense or dispense upon customer input. In at least one embodiment, the customer will be notified that product 110 is ready. In at least one embodiment, the customer can take the container 120 with the product 110 and be directed to the next dispensing location if multiple products 110 are in queue.

In at least one embodiment, the method and/or system 100 can utilize a proprietary soft container or a standard rigid container. In at least one embodiment, the method and/or system 100 can include features that guarantee that the container is positioned and opened properly.

In at least one embodiment, lids of the transport container 120 can provide for fitment on standard rigid containers. In at least one embodiment, lids of the transport container 120 can provide for alignment to the dispenser port 210. In at least one embodiment, lids of the transport container 120 can provide for hanging containers 120 when storing. In at least one embodiment, lids of the transport container 120 can provide for conveniently labelling, opening the container 120, closing the container 120, or any combination thereof.

In at least one embodiment, the product containers 200 can interlock with features in the housing 300 and/or access doors to accurately, dispense, weigh, and seal each product container 200. In at least one embodiment, additional space within the housing 300 can be utilized for storage of, additional product 110, empty product containers 200, containers 120, new and/or pre-filled, or any combination thereof.

In at least one embodiment, the product containers 200 can shift product forward to the dispensing port 210, reducing the need for slanted surfaces, better utilizing space. In at least one embodiment, the system 100 can identify each product container 200.

In at least one embodiment, the flexible containers 120 can offer spill resistant dispensing. In at least one embodiment, the flexible containers 120 can be relatively inexpensive, reusable, cleanable, may be compostable, easy to carry, easy to store, or any combination thereof.

In at least one embodiment, online and/or remote apps can efficiently manage purchasing of product 110 by the customer. In at least one embodiment, online and/or remote apps can provide inventory management and/or customer service by a service provider.

In at least one embodiment, one or more sensors can be used to measure temperature and/or humidity for product safety. In at least one embodiment, one or more sensors can be used to measure acceleration for tamper resistance weighing accuracy. In at least one embodiment, one or more sensors can be used to provide vision for customer identification and/or feedback. In at least one embodiment, one or more sensors can be used to measure ambient light for power saving. In at least one embodiment, one or more sensors can be used to measure motion for power saving and/or customer presence detection. In at least one embodiment, one or more sensors can be used to measure magnetics and/or optical for container 120 position. In at least one embodiment, external quick response (QR) code(s) can provide for machine identification, uniform resource locator (URL) pointing, online instructions, or any combination thereof. As another example, in at least one embodiment, one or more QR codes can be utilized for identifying one or more users, one or more orders, or any combination thereof.

In at least one embodiment, a system for dispensing products can include first and second product containers, each having a sealing dispenser port for containing a product therein; a housing having first and second product container cavities to selectively receive either the first or the second product container; a controller configured to identify which product is in which product container cavity and open the sealing dispenser ports to selectively dispense a specified quantity of the first product and a specified quantity of the second product. In at least one embodiment, the controller can be mounted within the housing.

In at least one embodiment, one or more of the product containers can include an identification tag and the housing can include an identification sensor associated with each product container cavity. In at least one embodiment, the controller can identify which product container is in which cavity using the identification tags and the identification sensors.

In at least one embodiment, one or more of the dispenser ports can selectively seal the respective product container and/or dispense the product from the respective product container. In at least one embodiment, the controller can be configured to selectively open the sealing dispenser ports to selectively dispense specified quantities of each of the products. For example, the housing can include one or more sealing dispenser port actuators for selectively dispensing from the product container cavities. In at least one embodiment, the controller can selectively trigger the port actuators to open the sealing dispenser ports to selectively dispense specified quantities of each of the products.

In at least one embodiment, the housing can include one or more quantity sensors associated with the product container cavities, with each quantity sensor detecting a product quantity within the respective product container cavity. In at least one embodiment, the controller can be configured to selectively open the sealing dispenser ports to selectively dispense specified quantities of each of the products based at least in part on the quantity sensors.

In at least one embodiment, one or more of the product containers can include a product driver configured to selectively shift the product in the product container toward the dispenser port. In at least one embodiment, the housing can include one or more product driver actuators, each associated with one of the product container cavities. In at least one embodiment, the controller is further configured to monitor the quantity sensors and energize the product driver actuators based at least in part on the quantity sensors.

In at least one embodiment, the housing can include a touchscreen display providing a user interface. In at least one embodiment, the touchscreen can be operatively coupled to the controller. In at least one embodiment, the controller can include a wireless communications module configured to communicate with a user application, such as can run on a smartphone, table, or other portable device, which provides a user interface. In at least one embodiment, the controller can be operatively coupled to a remote server which provides a user interface, such as a webpage available over the Internet.

In at least one embodiment, a user can specify the quantity or quantities of the product(s) through the user interface. In at least one embodiment, a user can pay for the specified quantity or quantities of the product(s) through the user interface. In at least one embodiment, a user can initiate dispensing of the specified quantity or quantities of the product(s) through the user interface. In at least one embodiment, a user can specify the quantity or quantities of the product(s) by weight, volume, price, nutritional content, by recipe, or any combination thereof.

In at least one embodiment, the controller can monitor the product quantities and facilitate replenishment of the product quantities. For example, in at least one embodiment, the controller can be operatively coupled to a server configured to monitor the product quantities, report the product quantities to an operator, and thereby facilitate replenishment of the product quantities.

In at least one embodiment, a system for dispensing products can include one or more product containers, each having a sealing dispenser port for containing a product. In at least one embodiment, the sealing dispenser port can be configured to selectively seal the product container and selectively dispense the product from the product container. In at least one embodiment, the sealing dispenser port can selectively provide an airtight seal for the product container, thereby preventing contamination of the product. In at least one embodiment, the system can include a housing having a product container cavity for removably receiving the product container, a quantity sensor for detecting a product quantity within the product container, and a sealing dispenser port actuator for selectively dispensing the product from the product container. In at least one embodiment, the system can include a controller configured to monitor the quantity sensor and selectively open the sealing dispenser port to dispense a specified quantity of the product.

In at least one embodiment, the product container can include an identification tag. In at least one embodiment, the housing can include an identification sensor. In at least one embodiment, the controller can monitor the identification sensor and identify the product contained in the product container using the identification sensor and the identification tag.

In at least one embodiment, the product container can include a product driver to selectively shift the product contained in the product container toward the sealing dispenser port of the product container. In at least one embodiment, the housing can include a product driver actuator. In at least one embodiment, the controller can selectively energize the product driver actuator and thereby cause the product driver to shift the product toward the sealing dispenser port of the product container.

In at least one embodiment, the first quantity sensor can detect a weight of the product container. In at least one embodiment, the controller can determine the product quantity within first product container using the quantity sensor. In at least one embodiment, the controller can determine a quantity of the product dispensed from the product container using the quantity sensor. For example, in at least one embodiment, the controller can determine when the specified quantity of the product has been dispensed from the product container using the quantity sensor. For example, in at least one embodiment, the specified quantity can be dispensed by monitoring a weight of the product container as the product is being dispensed.

In at least one embodiment, the housing can include a product dispensing station positioned below the sealing dispenser port of the product container. In at least one embodiment, the product dispensing station can selectively receive and support a rigid transportation container. In at least one embodiment, the product dispensing station can selectively receive, support, and hold open a flexible transportation container.

In at least one embodiment, the housing can include a product view port positioned above the product dispensing station. In at least one embodiment, the product view port can provide an indication of the product contained in the product container.

In at least one embodiment, the housing can include a second product dispensing station positioned next to, or below, a first product dispensing station and below a second sealing dispenser port of a second product container. In at least one embodiment, the second product dispensing station can selectively receive and support a rigid transportation container. In at least one embodiment, the second product dispensing station can selectively receive, support, and hold open a flexible transportation container. In at least one embodiment, the housing can include a vending sensor to detect proper placement of a transportation container below the sealing dispenser port and/or confirm that the transportation container is ready to receive the product.

In at least one embodiment, the housing can include a touchscreen display configured to provide a user interface. In at least one embodiment, the controller can include a wireless communications module configured to communicate with a user application, which may operate on a portable user device, to provide a user interface. In at least one embodiment, the controller can be operatively coupled to a local or remote server that provides a user interface, such as through a web page available on the Internet. In at least one embodiment, the controller can receive an indication of the specified quantity from a user over the Internet and/or a wireless communication link.

In at least one embodiment, the user interface can allow a user to select which ones of a plurality of products contained in the product containers. In at least one embodiment, the user interface can allow a user to specify the specify one or more quantities of the product(s) to be dispensed from the product containers. In at least one embodiment, the user interface can allow a user to pay for the specified quantity or quantities of the product(s). In at least one embodiment, the user interface can allow a user to initiate dispensing of the specified quantity of the first product.

In at least one embodiment, the user interface can allow a user to specify the specified quantity or quantities of the product(s) by choosing a price, a weight, a volume, a nutritional content, or any combination thereof. In at least one embodiment, the user interface can allow a user to specify the specified quantity or quantities of the product(s) by identifying a recipe.

In at least one embodiment, the controller can monitor the product quantity and facilitate replenishment of the product quantity within the product container. For example, in at least one embodiment, the controller can be operatively coupled to a server which can monitor the product quantity within the product container, report the product quantity to an operator, and thereby facilitate replenishment of the product quantity within the product container. In at least one embodiment, the controller can monitor the product quantity within the product container, be operatively coupled to a server configured to report the product quantity to an operator, and thereby facilitate replenishment of the product quantity within the product container. In at least one embodiment, replenishment of the product quantity within the product container can comprise replacement of the product container, such as with a full container stored within the housing. In at least one embodiment, the controller and/or the server are mounted within the housing.

In at least one embodiment, a method of dispensing a product can include receiving one or more product containers into one or more cavities of a housing; identifying one or more products within the one or more product containers using one or more tags on the one or more product containers; receiving an order for one or more of the products from a user, the order specifying a quantity or quantities of the one or more products; dispensing the specified quantity or quantities of the one or more products by monitoring a change in a weight of the one or more product containers; sealing the one or more product containers after dispensing the specified quantity or quantities of the one or more products; or any combination thereof.

In at least one embodiment, identifying the product(s) comprises reading on or more electronic tags, such as an RFID tag. In at least one embodiment, the order can be received through a touchscreen user interface attached to the housing. In at least one embodiment, the order can be received through wireless communications and/or over the Internet. In at least one embodiment, the order can specify the specified quantity of the product by weight, volume, price, nutritional content, recipe, or any combination thereof.

In at least one embodiment, the method can include triggering a notification when the weight of one or more of the product containers drops below a threshold. In at least one embodiment, the method can include triggering a product driver to drive product towards a dispensing port of the one or more product containers. For example, in at least one embodiment, the method can include triggering a product driver to drive the product within one of the product containers towards a dispensing port of that product container, when the weight of that product container drops below a threshold. In at least one embodiment, the method can include triggering a product driver to drive product towards a dispensing port of the one or more product containers, during dispensing of product from that product container.

In at least one embodiment, the method can include providing a user with an indication of where to place a transportation container to contain the specified quantity of the product(s). For example, in at least one embodiment, the method can include providing a user with an indication of where to place a transportation container to contain the specified quantity of the product(s), between receiving the order and dispensing the product.

In at least one embodiment, the method can include providing a user with an indication of a transportation container size necessary to contain the specified quantity of the product(s). For example, in at least one embodiment, the method can include providing a user with an indication of a transportation container size necessary to contain the specified quantity of the product(s), between receiving the order and dispensing the product.

In at least one embodiment, the method can include confirming proper placement of a transportation container below a dispensing port of a product container before dispensing of the product in that product container. In at least one embodiment, the method can include confirming payment for the specified quantity before dispensing of the product in that product container.

In at least one embodiment, the method can include detecting a presence of the user. For example, in at least one embodiment, the method can include detecting a presence of the user, between receiving the order and dispensing the product. In at least one embodiment, the method can include sealing the specified quantity of the first product within a transportation container; preventing access to the transportation container; detecting a presence of the user; and thereafter providing access to the transportation container.

Other and further embodiments utilizing one or more aspects of the disclosure can be devised without departing from the spirit of Applicants' disclosure. For example, the devices, systems and methods can be implemented for numerous different types and sizes of systems and products in numerous different industries. Further, the various methods and embodiments of the devices, systems and methods can be included in combination with each other to produce variations of the disclosed methods and embodiments. Discussion of singular elements can include plural elements and vice-versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A system for dispensing products, comprising:
a first product container having a first sealing dispenser port for containing a first product, the first sealing dispenser port configured to selectively seal the first product container and selectively dispense the first product from the first product container, wherein the first product container includes a first identification tag and a first product driver configured to selectively shift the first product toward the first sealing dispenser port;
a second product container having a second sealing dispenser port for containing a second product, the second sealing dispenser port configured to selectively seal the second product container and selectively dispense the second product from the second product container, wherein the second product container includes a second identification tag and a second product driver configured to selectively shift the second product toward the second sealing dispenser port;
a housing having first and second product container cavities, wherein each product container cavity is configured to selectively receive the first product container, and wherein each product container cavity is configured to selectively receive the second product container;
wherein the housing includes a first quantity sensor for detecting a first product quantity within the first product container cavity and a second quantity sensor for detecting a second product quantity within the second product container cavity;
wherein the housing includes a first sealing dispenser port actuator for selectively dispensing from the first product container cavity, and a second sealing dispenser port actuator for selectively dispensing from the second product container cavity;
wherein the housing includes a first identification sensor associated with the first product container cavity and a second identification sensor associated with the second product container cavity;
wherein the housing includes a first product driver actuator associated with the first product container cavity and a second product driver actuator associated with the second product container cavity;
a controller configured to identify which product container is in which product container cavity using the first and second identification tags and the first and second identification sensors, and to thereby identify which product is in which product container cavity;
wherein the controller is further configured to receive a first price associated with the first product and a second price associated with the second product;
wherein the controller is further configured to calculate a first specified quantity of the first product based on the first price and calculate a second specified quantity of the second product based on the second price;
wherein the controller is further configured to monitor the quantity sensors and energize the product driver actuators based at least in part on the quantity sensors; and
wherein the controller is further configured to selectively open the sealing dispenser ports to selectively dispense the first specified quantity of the first product and the second specified quantity of the second product based at least in part on the quantity sensors.

2. The system of claim 1, wherein the housing further includes a touchscreen display configured to provide a user interface and thereby allow a user to specify the specified quantities, pay for the specified quantities, and initiate dispensing of the specified quantities, wherein the user interface is configured to allow the user to specify the specified quantities by choosing a price providing the first price and the second price, and wherein the user interface is configured to allow the user to specify the specified quantities by identifying a recipe.

3. The system of claim 1, wherein the controller further includes a wireless communications module configured to communicate with a user application and thereby allow a user to specify the specified quantities, pay for the specified quantities, and initiate dispensing of the specified quantities, wherein the user application is configured to allow the user to specify the specified quantities by choosing a price providing the first price and the second price, and wherein the user application is configured to allow the user to specified quantities by identifying a recipe.

4. The system of claim 1, wherein the controller is operatively coupled to a remote server configured to allow a user to specify the specified quantities, and pay for the specified quantities.

5. The system of claim 1, wherein the controller is operatively coupled to a server configured to monitor the product quantities, report the product quantities to an operator, and thereby facilitate replenishment of the product quantities.

6. A system for dispensing products, comprising:
a first product container having a first sealing dispenser port for containing a first product, the first sealing dispenser port configured to selectively seal the first product container and selectively dispense the first product from the first product container;
a housing having a first product container cavity for removably receiving the product container, a first quantity sensor for detecting a first product quantity within the first product container, and a first sealing dispenser port actuator for selectively dispensing the first product from the first product container; and
a controller configured to monitor the first quantity sensor and selectively open the first sealing dispenser port to dispense a specified quantity of the first product;
wherein the housing further includes a first product dispensing station positioned below the first sealing dispenser port of the first product container, wherein the first product dispensing station is configured to selectively receive and support a rigid transportation container, and wherein the first product dispensing station is configured to selectively receive, support, and hold open a flexible transportation container; and wherein the housing further includes a second product dispensing station positioned next to the first product dispensing station and below a second sealing dispenser port of a second product container, wherein the second product dispensing station is configured to selectively receive and support a rigid transportation container, and wherein the second product dispensing station is configured to selectively receive, support, and hold open a flexible transportation container.

7. The system of claim 6, wherein the first product container includes a first identification tag, wherein the housing includes a first identification sensor, and wherein the controller is further configured to monitor the first identification sensor and identify the first product contained in the first product container using the first identification sensor and the first identification tag.

8. The system of claim 6, wherein the first product container includes a first product driver configured to selectively shift the first product contained in the first product container toward the first sealing dispenser port of the first product container, wherein the housing includes a first product driver actuator, and wherein the controller is further configured to selectively energize the first product driver actuator and thereby cause the first product driver to shift the first product toward the first sealing dispenser port of the first product container.

9. The system of claim 6, wherein the first quantity sensor detects a first weight of the first product container, wherein the controller is further configured to determine the first product quantity within the first product container using the first quantity sensor, and wherein the controller is further configured to determine the specified quantity of the first product dispensed from the first product container using the first quantity sensor.

10. The system of claim 6, wherein the housing further includes a first product view port positioned above the first product dispensing station, the first product view port providing an indication of the first product contained in the first product container.

11. The system of claim 6, wherein the housing further includes a touchscreen display configured to provide a user interface and thereby allow a user to select the first product, specify the specified quantity of the first product to be dispensed from the first product container, pay for the specified quantity of the first product, and initiate dispensing of the specified quantity of the first product.

12. The system of claim 11, wherein the user interface is configured to allow the user to specify the specified quantity of the first product by specifying a price.

13. The system of claim 11, wherein the user interface is configured to allow the user to select the first product and specify the specified quantity of the first product to be dispensed by identifying a recipe.

14. The system of claim 6, wherein the controller further includes a wireless communications module configured to communicate with a user application and thereby allow a user to select the first product, specify the specified quantity of the first product to be dispensed from the first product container, pay for the specified quantity of the first product, and initiate dispensing of the specified quantity of the first product.

15. The system of claim 14, wherein the user application is configured to allow the user to specify the specified quantity of the first product by specifying a price.

16. The system of claim 14, wherein the user application is configured to allow the user to select the first product and specify the specified quantity of the first product to be dispensed by identifying a recipe.

17. The system of claim 6, wherein the controller is operatively coupled to a remote server configured to allow a user to select the first product, specify the specified quantity of the first product to be dispensed from the first product container, and pay for the specified quantity of the first product.

18. A system for dispensing products, comprising:
a first product container having a first sealing dispenser port for containing a first product, the first sealing dispenser port configured to selectively seal the first product container and selectively dispense the first product from the first product container;
a second product container having a second sealing dispenser port for containing a second product, the second sealing dispenser port configured to selectively seal the second product container and selectively dispense the second product from the second product container;
a housing having a first product container cavity for removably receiving the first product container, a first quantity sensor for detecting a first product quantity within the first product container, and a first sealing dispenser port actuator for selectively dispensing the first product from the first product container;
wherein the housing further includes a first product dispensing station positioned below the first sealing dispenser port of the first product container, wherein the first product dispensing station is configured to selectively receive and support a first rigid transportation container, and wherein the first product dispensing station is configured to selectively receive, support, and hold open a first flexible transportation container;
wherein the housing further includes a second product container cavity for removably receiving the second product container below the first product container cavity, a second quantity sensor for detecting a second product quantity within the second product container, and a second sealing dispenser port actuator for selectively dispensing the second product from the second product container;
wherein the housing further includes a second product dispensing station positioned below the second sealing dispenser port of the second product container, wherein the second product dispensing station is configured to selectively receive and support a second rigid transportation container, and wherein the second product dispensing station is configured to selectively receive, support, and hold open a second flexible transportation container; and
a controller configured to monitor the first quantity sensor, monitor the second quantity sensor, selectively open the first sealing dispenser port to dispense a first specified quantity of the first product, and selectively open the second sealing dispenser port to dispense a second specified quantity of the second product.

19. The system of claim 18, further including:
a third product container having a third sealing dispenser port for containing a third product, the third sealing dispenser port configured to selectively seal the third product container and selectively dispense the third product from the third product container;
wherein the housing further includes a third product container cavity for removably receiving the third product container next to the first product container cavity, a third quantity sensor for detecting a third product quantity within the third product container, and a third sealing dispenser port actuator for selectively dispensing the third product from the third product container; and wherein the housing further includes a third product dispensing station positioned below the third sealing dispenser port of the third product container, wherein the third product dispensing station is configured to selectively receive and support a third rigid transportation container, and wherein the third product dispensing station is configured to selectively receive, support, and hold open a third flexible transportation container.

20. The system of claim 18, wherein the controller is further configured to receive a first price associated with the first product and a second price associated with the second product; and wherein the controller is further configured to calculate the first specified quantity of the first product based on the first price and calculate the second specified quantity of the second product based on the second price.

* * * * *